United States Patent
Howard et al.

(10) Patent No.: US 10,841,404 B2
(45) Date of Patent: Nov. 17, 2020

(54) EVENTS DISCOVERY CONTEXT

(71) Applicant: Facebook, Inc., Menlo Park, CA (US)

(72) Inventors: Michael Andrew Howard, Redwood City, CA (US); Jasper Reid Hauser, San Francisco, CA (US); Scott Joseph Robert Horsfall, Redwood City, CA (US); Vijay Sivakumar, Santa Clara, CA (US); Dan Ionut Fechete, Mountain View, CA (US); Zhiyuan Zhang, Fremont, CA (US); Xuan Jiang, Sunnyvale, CA (US); Xun Gong, West Hollywood, CA (US)

(73) Assignee: Facebook, Inc., Menlo Park, CA (US)

( * ) Notice: Subject to any disclaimer, the term of this patent is extended or adjusted under 35 U.S.C. 154(b) by 322 days.

(21) Appl. No.: 15/207,331

(22) Filed: Jul. 11, 2016

(65) Prior Publication Data
US 2018/0013861 A1    Jan. 11, 2018

(51) Int. Cl.
| | | |
|---|---|---|
| H04L 29/08 | (2006.01) | |
| G06F 16/951 | (2019.01) | |
| G06Q 10/10 | (2012.01) | |
| G06Q 50/00 | (2012.01) | |

(52) U.S. Cl.
CPC ............ *H04L 67/36* (2013.01); *G06F 16/951* (2019.01); *G06Q 10/101* (2013.01); *G06Q 50/01* (2013.01); *H04L 67/02* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,700,540 | B1* | 4/2014 | Zambrano | G06Q 50/01 705/319 |
| 2011/0167054 | A1* | 7/2011 | Bailey | G06F 16/358 707/710 |
| 2012/0148165 | A1* | 6/2012 | Yabu | G06K 9/6224 382/225 |
| 2013/0060744 | A1* | 3/2013 | Roychoudhuri | G06Q 50/01 707/706 |
| 2013/0227011 | A1* | 8/2013 | Sharma | G06Q 30/0241 709/204 |
| 2014/0067937 | A1* | 3/2014 | Bosworth | G06Q 50/01 709/204 |
| 2016/0162952 | A1* | 6/2016 | Bedingfield, Sr. | G06Q 30/0269 705/14.66 |
| 2016/0283483 | A1* | 9/2016 | Jiang | G06F 16/248 |

\* cited by examiner

*Primary Examiner* — Younes Naji
(74) *Attorney, Agent, or Firm* — Baker Botts L.L.P.

(57) ABSTRACT

In one embodiment, a method includes identifying one or more social network events that satisfy a query condition in a social-networking system, determining an event score for each of the identified events, where the event score is based on one or more signals that are each related to a first interaction between a target user and the social-networking system, and the first interaction associates the target user with the identified event, and presenting one or more of the identified events to the target user in an order based on the event score of each identified event. The interaction may establish an association between the target user and an entity associated with the event.

20 Claims, 15 Drawing Sheets

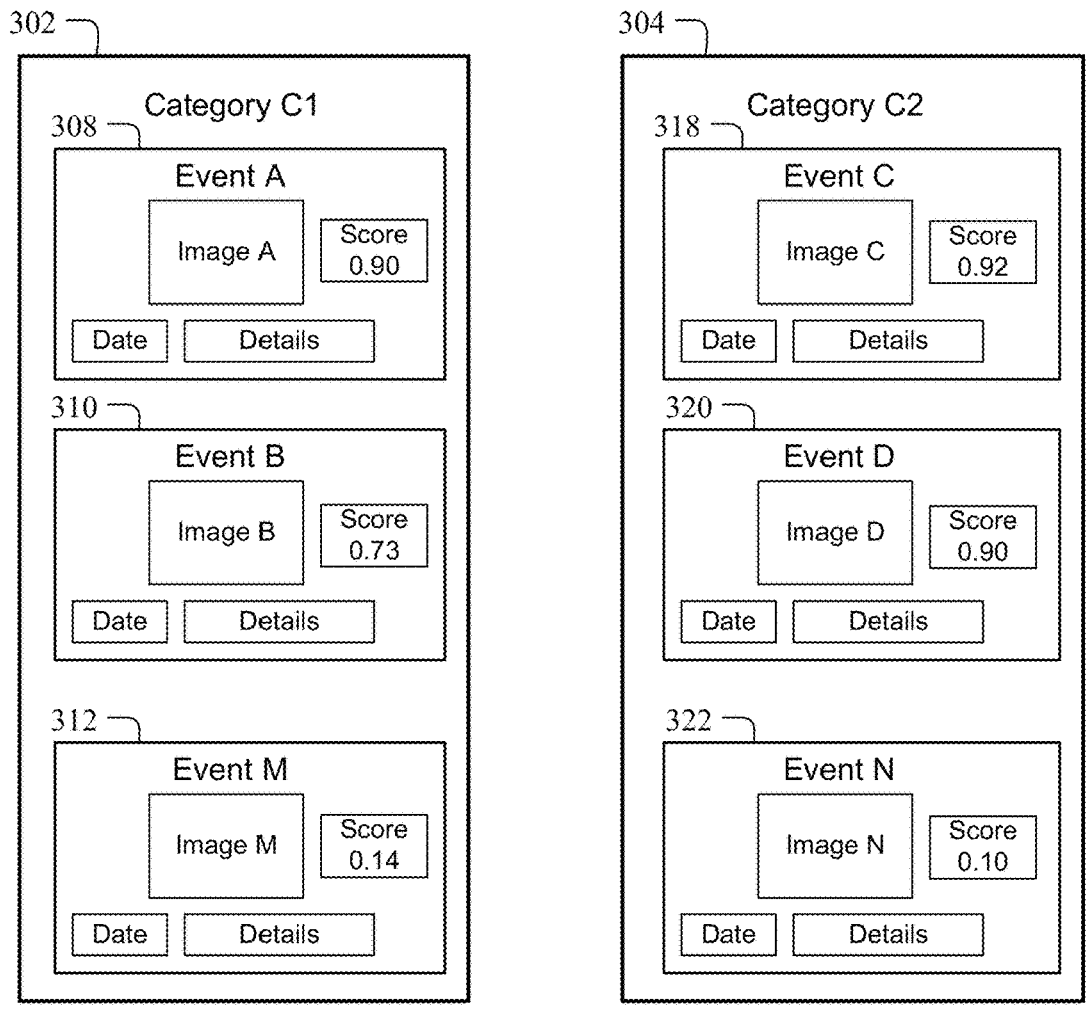
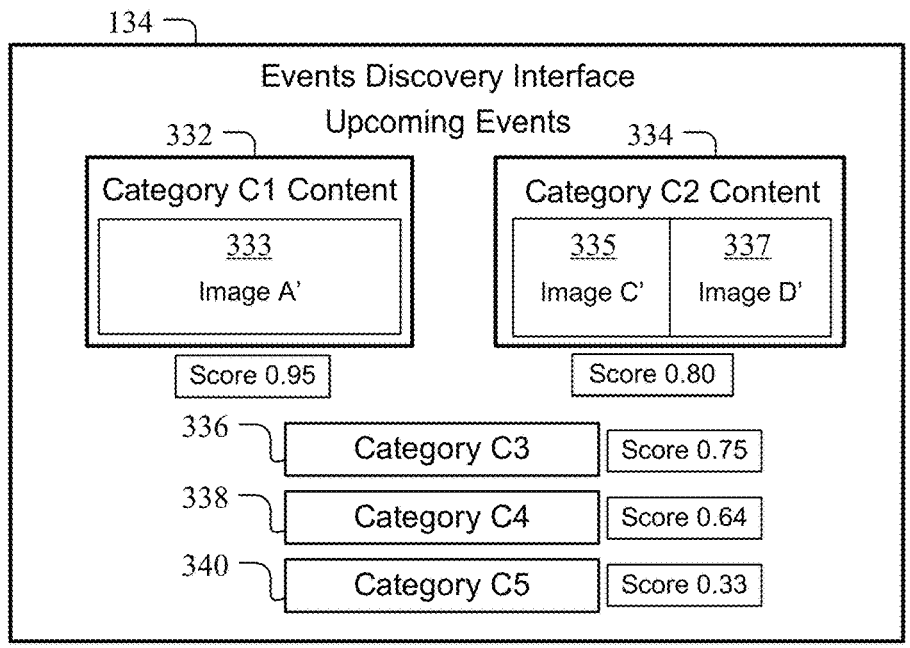
FIG. 3

Event Signals

| User | Event | Likes Venue | Group Member | Same Venue | Implied Likes | Likes Same Cat. | Likes Similar Cat. | Friend Going | Total | Max | Score (Total/Max) | Rank |
|---|---|---|---|---|---|---|---|---|---|---|---|---|
| Alex | E1 | 0 | 0 | 2 |  | 0 | 0.8 | 0 | 2.8 | 35 | 0.08 | 1 |
|  | E2 | 0 | 0 | 0 | Country | 1 | 0 | 0 | 1 | 35 | 0.03 | 2 |
|  | E3 | 0 | 0 | 0 | Electronic | 1 | 0 | 0 | 1 | 35 | 0.029 | 4 |
|  | E4 | 1 | 0 | 0 |  | 0 | 1.05 | 0 | 1.05 | 35 | 0.03 | 2 |
|  | E5 | 0 | 0 | 0 |  | 0 | 0 | 0 | 0 | 35 | 0 | 5 |
| Betsy | E1 | 0 | 0 | 0 |  | 0 | 0.6 | 0 | 0.6 | 35 | 0.017 | 4 |
|  | E2 | 0 | 0 | 0 |  | 0 | 0.8 | 0 | 0.8 | 35 | 0.023 | 3 |
|  | E3 | 0 | 0 | 0 |  | 0 | 0.25 | 0 | 0.25 | 35 | 0.007 | 5 |
|  | E4 | 0 | 1 | 0 |  | 1 | 0 | 0 | 2 | 35 | 0.057 | 1 |
|  | E5 | 0 | 0 | 0 |  | 0 | 0 | 2 | 2 | 35 | 0.057 | 1 |
| Cathy | E1 | 0 | 0 | 0 |  | 0 | 0.3 | 0.3 | 0.6 | 35 | 0.017 | 3 |
|  | E2 | 0 | 0 | 0 |  | 1 | 0 | 1 | 2 | 35 | 0.057 | 1 |
|  | E3 | 0 | 0 | 0 |  | 0 | 0.2 | 0.2 | 0.4 | 35 | 0.011 | 4 |
|  | E4 | 0 | 0 | 0 |  | 0 | 0.8 | 0.8 | 1.6 | 35 | 0.046 | 2 |
|  | E5 | 0 | 0 | 0 |  | 0 | 0 | 0 | 0 | 35 | 0 | 5 |
| Eric | E1 | 0 | 0 | 0 |  | 0 | 0.6 | 0 | 0.6 | 35 | 0.017 | 2 |
|  | E2 | 0 | 0 | 0 |  | 0 | 0.8 | 0 | 0.8 | 35 | 0.023 | 1 |
|  | E3 | 0 | 0 | 0 |  | 0 | 0.25 | 0 | 0.25 | 35 | 0.007 | 3 |
|  | E4 | 0 | 0 | 0 |  | 0 | 0 | 0 | 0 | 35 | 0 | 4 |
|  | E5 | 0 | 0 | 0 |  | 0 | 0 | 0 | 0 | 35 | 0 | 4 |

*FIG. 11*

Similarity Coefficients

| Category | Music | Country Music | Country-bro Music | Alt. Rock Music | Electronic Music |
|---|---|---|---|---|---|
| Music | 1 | 0.9 | 0.9 | 0.9 | 0.9 |
| Country | 0.9 | 1 | 0.8 | 0.3 | 0.2 |
| Country-bro | 0.9 | 0.8 | 1 | 0.6 | 0.25 |
| Alt. Rock | 0.9 | 0.3 | 0.6 | 1 | 0.5 |
| Electronic | 0.9 | 0.2 | 0.25 | 0.5 | 1 |

*FIG. 12*

EVENTS DISCOVERY CONTEXT

TECHNICAL FIELD

This disclosure generally relates to discovery of events in an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

An events ecosystem in an online social network may be used to organize and promote real-world events such as concerts, theater performances, sports games, or other social events. The real-world events may be represented as online events in the online social network, which may be presented to users in a user interface as, for example, an event name and associated details such as date and location, and an optional associated graphical image. Users may interact with the online events, e.g., to register to attend, view a list of friends who are registered to attend, manage, or otherwise view or modify information associated with the online events. Because of the large number of such online events, it may be time-consuming or otherwise difficult for users to discover online events of interest. In particular embodiments, to assist users in finding events of interest, an events discovery system may identify and present categories of online events, e.g., music, food, sports, and so on. A user may select a particular category, e.g., music, and the events discovery system may present events from the selected category. The events may be presented in an order based on their relevance to the user. For example, a relevance score may be determined for each event based on characteristics of the user and of the event, and a threshold number of the events having the highest scores may be sorted by score and displayed to the user.

In particular embodiments, one or more social-networking system events to be evaluated for recommendation to a target user may be selected from a set of events stored in a data store or other event storage system. To identify the events to be recommended to a target user, the social-networking system may identify one or more social network events that satisfy a query condition, which may be, for example, events that friends of the target user have registered to attend, events within a threshold distance of the target user's geographical location, or events associated with a selected event category, venue, location, or date. The social-networking system may determine an event score for each of the identified events based on one or more signals that are each related to an interaction between a target user and the social-networking system. The score may be determined, for example, as a weighted average of the signal values, or may be determined by a machine-learning algorithm based on the signal values.

The user interactions related to the signals may include an interaction that associates the target user with the identified event, e.g., an interaction that associates the target user with an entity that is in turn associated with the event. The signals may be related to an interaction between the user and the social-networking system in which the user indicates that he or she likes particular venues, artists, categories of music, tags. The signals may be related to other types of relations between entities and users. A signal value may be related to, for example, an interaction in which the user indicates he or she is close friends with another user who is going to the event, an interaction in which the user indicates he or she likes the event's venue, an interaction in which the user indicates that he or she is a member of a group that organized the event, an interaction in which the user indicates he or she has attended a previous event associated with the entity, e.g., a previous event at the venue, an interaction in which the user indicates that he or she likes a category associated with the event or a similar category, or other interaction between the user and the social-networking system. One or more of the identified events may be presented to the user in an order based on the event score of each identified event. For example, the five highest-scoring events may be displayed in an events discovery user interface.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims.

The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates example event categories in an events discovery user interface.

FIG. 11 illustrates example event signal data and corresponding scores based on the example social graph of FIG. 10.

FIG. 12 illustrates example similarity coefficients for example event categories.

DESCRIPTION OF EXAMPLE EMBODIMENTS

Figure 1:
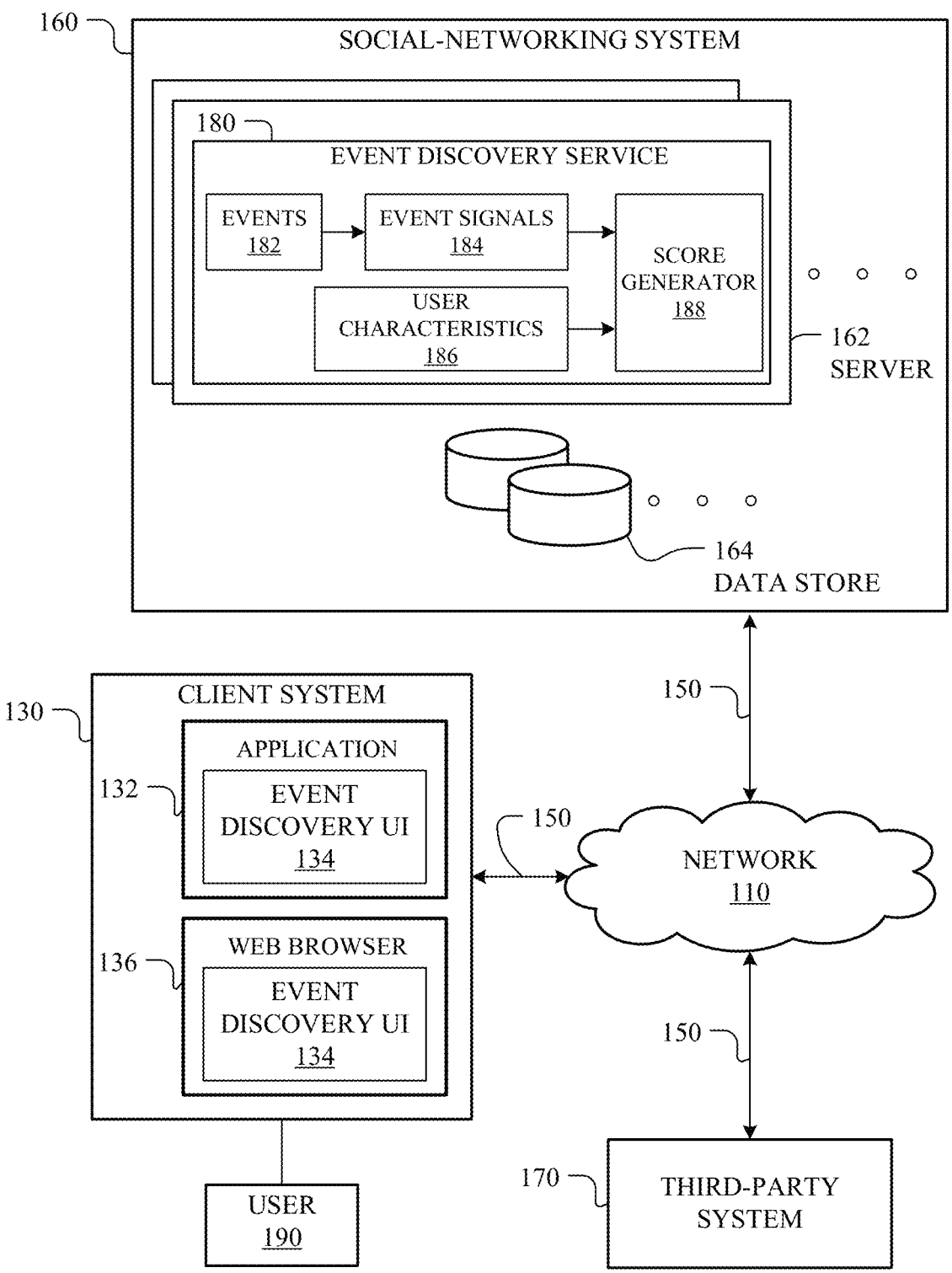
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "like" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
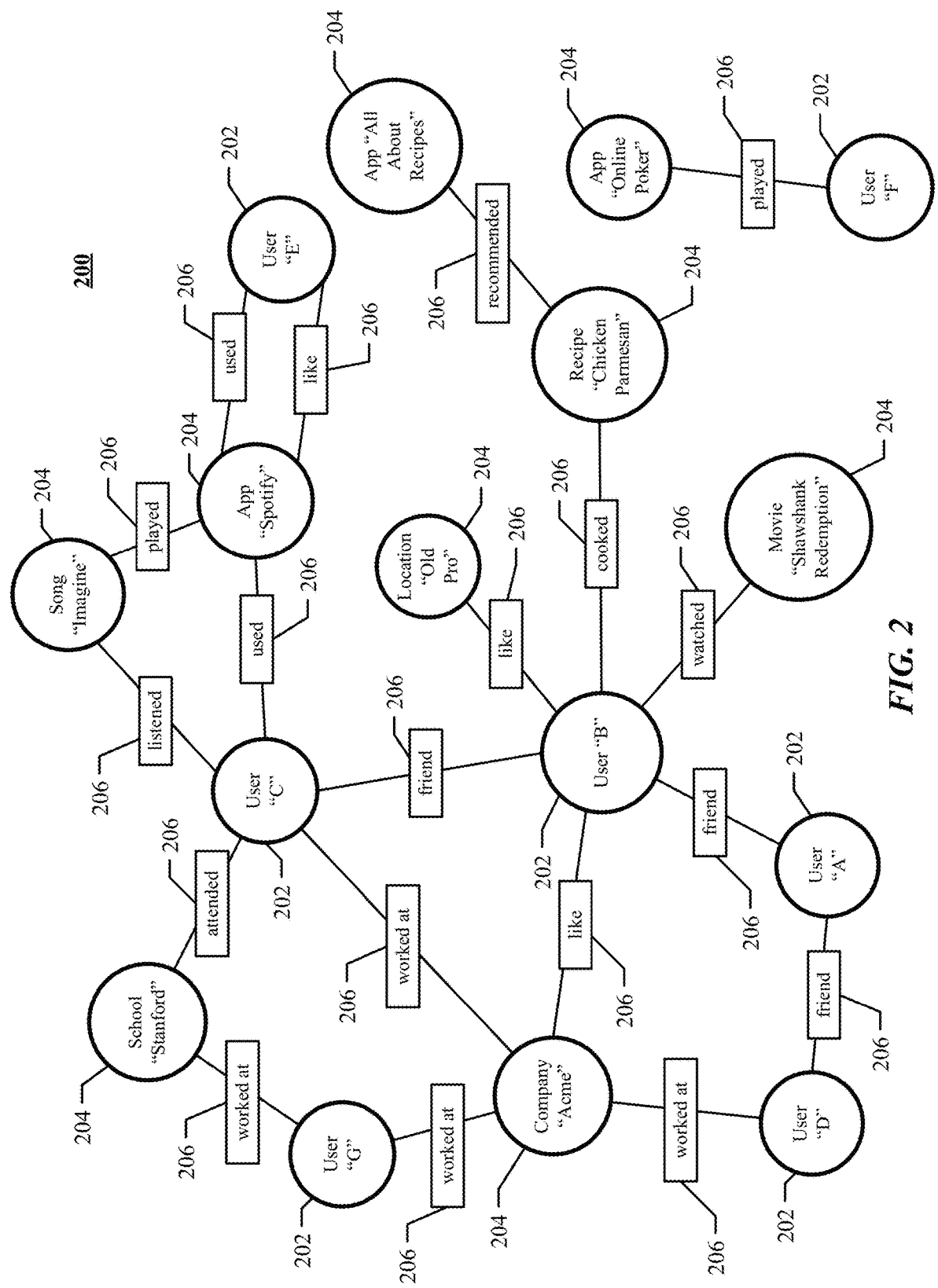
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200

(i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

An events ecosystem in an online social network may be used to organize and promote real-world events such as concerts, theater performances, sports games, or other social events. The real-world events may be represented as online events in the online social network, which may be presented to users in a user interface as, for example, an event name and associated details such as date and location, and an optional associated graphical image. Users may interact with the online events, e.g., to register to attend, view a list of friends who are registered to attend, manage, or otherwise view or modify information associated with the online events. Because of the large number of such online events, it may be time-consuming or otherwise difficult for users to discover online events of interest. In particular embodiments, to assist users in finding events of interest, an events discovery system may identify and present categories of online events, e.g., music, food, sports, and so on. A user may select a particular category, e.g., music, and the events discovery system may present events from the selected category. The events may be presented in an order based on their relevance to the user. For example, a relevance score may be determined for each event based on characteristics of the user and of the event, and a threshold number of the events having the highest scores may be sorted by score and displayed to the user.

In particular embodiments, interactions with a user 190, which may include receiving as input requests to display events and displaying the events as output, may be performed by an events discovery user interface 134. The events discovery user interface 134 may be located on a client system 130, such as a mobile telephone or other computing device. For example, the user 190 may access the events discovery UI by selecting an option such as a menu item or icon labeled "Events" in a mobile application 132 or web browser application 136 executing on the client system 130. The events discovery user interface 134 may send requests for information, such as event categories and individual events of interest to the user 190, to an events discovery service 180 via a communications network 110 or other appropriate communication mechanism.

In particular embodiments, one or more servers 162 may be events discovery servers that implement the events discovery service 180. The events discovery service 180 may perform tasks as appropriate to respond to the requests, such as identifying, in a database such as the data store 164, events 182 that may interest the user 190, and ranking and filtering the identified events 182 so that events of greatest potential interest to the user 190 may be presented in the events discovery user interface 130 on the client system 130. The social-networking system 160 may exclude one or more of the identified events from presentation to the target user based on a filtering condition. The ranking and filtering may be performed by determining a score for each of the events 182, ranking the events 182 according to their scores, and excluding from the resulting list events 182 having scores that do not satisfy a filtering condition. For example, the events may be ranked according to their scores, and the predetermined number of the highest-scoring events may be presented to the user 190 as recommended events. The scores may be generated by a score generator 188 based on event signals 184, which may be derived from the events 182, and on other information, such as the social graph 200 and user characteristics 186. The user characteristics 186 may include, for example, a user profile, user interaction history, or other information related to the user 190, any of which may be retrieved from the social graph 200. The events discovery service 180 may send the results, such as the ranked and filtered events of interest, to the events discovery user interface 134. The events discovery service 180 may be located on a social-networking system server 162 and may communicate with the events discovery user interface 134, which may be located on the client system 130, via the communications network 110 or other appropriate form of communication. Although the events discovery user interface 134 and events discovery service 180 are described as being located on different computer systems, other configurations are possible. For example, one or more components of the events discovery user interface 134 may be located on the same computer system as the events discovery service 180.

FIG. 3 illustrates example event categories in an events discovery user interface 134. In particular embodiments, a social-networking system 160 may identify one or more event categories 302 that may be of interest to a user 190. Each of the event categories 302 may include one or more social-networking events 308. For each identified event category 302, the social-networking system may generate an event category interface element 332 that represents the event category 302. The user 190 may select the event category interface element 332 to cause details about the category 302, e.g., a list of events 308, 310, 312 in the corresponding event category 302, to be displayed, in which case the event category interface element 332, and, optionally, other interface elements, such as event category interface elements 334-340, may be replaced in the displayed user interface 134 by the list of events 308, 310, 312 from the corresponding event category 302. The event category interface element 332 may include category content 333 that may be based on historical information associated with the user. The social-networking system may present the event category interface elements 332, 334 to the user, e.g., by displaying the event category interface elements in the events discovery user interface 134. The category content 333 may be based on at least one of the events 308, 310, 312 in the corresponding event category 302. For example, the category content 333 may be based on a highest-ranking event 308 in the event category 302, and may be an image based on the highest-ranking event 308, such as an Image A' based on the Image A. In this way, continuity may be provided between display of the event category user interface element 332 and display of the list of events 308, 310, 312 in the selected category 302.

In particular embodiments, two example categories, category C1 302 and category C2 304, are shown in FIG. 3. Categories C1 302 and C2 304 may be understood as data structure representations of the respective categories. Categories C1 302 and C2 304 may also represent categories displayed in the events discovery user interface 134. In this example, the category C1 302 includes events A 308 and B 310 through M 312. The category C2 304 includes events C 318 and D 320 through N 322. Information associated with each of the events may be displayed in the user interface, including a graphical image, video, or other media object that represents the event, a name and date of the event, and details about the event.

In particular embodiments, the events discovery user interface 134 may present the events in user interface components having formats similar to the events shown in the illustrated categories 302, 304, e.g., by displaying scrollable vertical lists of rectangular elements that represent events, which may include names and images of the corresponding events. Alternatively, the events discovery user interface may present the events in other formats, e.g., as scrollable horizontal lists of elements, as card stacks of partially-overlapping rectangular elements representing events, as text lists of event names. Each displayed event may be responsive to user selection, and when selected, details of the selected event, such as additional description, images, or user interface elements for interacting with the event may be presented.

In particular embodiments, a social-networking system 160 may identify one or more event categories 302, 304 that may be of interest to a user 190 of the social-networking system 160, where each of the event categories 302 includes one or more social-networking events 308, 310, 312. For each event category 302, the social-networking system 160 may generate an event category interface element 332 that represents the event category 302. The event category interface element 332 may include category content 333, e.g., an image, icon, video, or other media object, that is based on historical information associated with the user 190. The category content 333 may be the same as or a copy of a media object A 309 associated with the highest ranking event in the Category C1 302. The displayed media object A' may also include text, which may be a name or description of category C1 (e.g., "Music"). The displayed media object A' may be generated by applying transformations such as image processing to the image A 309, e.g., scaling, cropping, rotating, combining with other images or text (such as the category name), and the like. The social-networking system 160 may present, e.g., display, the event category interface elements 332 to the user 190.

In particular embodiments, if the category user interface element 332 is selected by the user 190, then the first event 308 in the ranked list of events 308, 310, 312 that is displayed in response to the user selection is the top-ranking event 308. When the event category user interface element 332 is selected, the event category interface element 332, and, optionally, other interface elements, such as other sections of the user interface 134 that may be displaying category user interface elements 334 or other displayed events or displayed event categories, may be replaced in the displayed events discovery user interface 124 by the list of events 308, 310, 312. In this way, continuity may be provided between display of the category user interface elements 332 and display of the list of events 302 in the selected category. As another example, referencing FIG. 4B, the categories 320 may include a category user interface element 432, which includes category content in the form of an image that contains the words "Music" and "BRYAN". The word "Music" is a category name added to the category content item in the element 432 (or, similarly, to the element 432). In this example, the word "BRYAN" and other portions of the image in the element 432 of FIG. 4B are from the image 507 associated with the top-ranking event in the category list shown in FIG. 5A.

In particular embodiments, category content 333 may be based on a plurality of events 318, 320 in an event category, and the category content may comprise an image based on a combination of a plurality of images of the event category 304, the plurality of images including images associated with a plurality of highest-ranking events in the category 304. As an example and not by way of limitation, a Category C2 user interface element 334 may include a combination of two category content items 335, 337, which may include first category content 335, e.g., Image C', and second category content 337, e.g., Image D', which are the top two highest ranking events in the category C2 304. The images C' and D' may be the same as or transformed variants of the images C and D. The images C' and D' may be shown adjacent to each other, or may be combined in other ways, e.g., using a portion of image C' and a portion of image D'.

Referencing FIG. 3, a portion of the events discovery user interface 134 shows one or more event category user interface elements 332, 334. Each event category user interface element 332 may include category content 333, which may be, e.g., one or more graphical images, videos, or other displayable media objects that represent the corresponding event category 302. The event category user interface elements 332, 334 may be displayed in predetermined locations in a predetermined order. Alternatively, the event category user interface elements 332, 334 may be displayed in an order that is based on the relevance of the categories 332, 334 to the user. In one example, the interface elements 332, 334 for the event categories 302, 304 may be presented in an order based on the scores of the events 308-312 and 319-322 in the respective categories. The social-networking system 160 may determine a score for each event category 302 based on the scores corresponding to the one or more social-networking events 308-312 in the event category 302. The interface elements 332, 334 for the one or more event categories 302, 304 may be presented in an order according to the scores of the respective categories 302, 304. The social-networking system 160 may determine a score for each event category 302, 304 based on historical information associated with the target user 190. The interface elements 332, 334 for the one or more event categories 302, 304 may be presented in an order according to the scores of the respective categories 302, 304. The historical information may include a history of one or more interactions between the target user and the social-networking system 160. The one or more event categories 302, 304 may be identified based on one or more interests or on a user profile of the target user 190.

In particular embodiments, the user 190 may select one of the category user interface elements 332, 338, e.g., by touching a touch screen in the region of a display screen that corresponds to the element 332 to be selected, or clicking a mouse button while a mouse pointer is in the region of the element 332. When the user selects one of the elements 332, 338, the events discovery user interface 134 may display a list of events in the category to which the selected element corresponds. For example, the list of events 308, 310, 312 in the category C1 302 may be displayed when the corresponding category user interface element 332 is selected. The list of events may be displayed in the user interface in the format shown for the category C1 302, or in another appropriate format that shows information about the events.

Figure 4A:
FIG. 4A illustrates example upcoming events, categories of nearby events occurring on particular dates, and events that are popular with friends in an events discovery user interface.
Figure 4B:
FIG. 4B illustrates an example event suggested for the user, event categories represented as graphical images, and events categories represented as textual category names.
Figures 5A, 5B:
FIG. 5A illustrates example events in a music category in an events discovery user interface.
FIG. 5B illustrates example events in a nightlife category in an events discovery user interface.

FIG. 4A shows an example user interface 402, which includes category user interface elements 412, 414 that represent categories of events near Palo Alto, Calif. occurring today (element 412) and this weekend (element 414). Additional category user interface elements 432-450 are shown in FIG. 4B. Note that a category user interface element may include text with no graphical image, as shown by the "Fine Arts—Crafts" element 440 in FIG. 4B. An example list of events for a Music category shown in FIG. 4C, and an example list of events for a Nightlife category is shown in FIG. 5B. The user interfaces shown in FIGS. 3-5B may be implemented by the events discovery user interface 134 using data and/or code received from the events discovery service 180 as described with reference to FIG. 8. The events discovery service 180 may generate or identify output data and/or code to be sent to the user interface 134 based at least in part on input data received from the user interface 134. The ordering of the events and event categories may be determined based on scores generated by the methods described with reference to FIGS. 13 and 14.

Referring again to FIG. 3, scores for the events in the categories 302, 304 are shown to illustrate ranking of the events by score. The events in a category 302 may be ranked according to relevance to the user, and, optionally, how closely the user knows friends who are going to the events. In one example, the degree of separation between the user and friends of the user who are going to an events may be used as a signal value for the event. Although scores are shown in FIG. 3, scores are not ordinarily shown in the user interfaces presented to users. The scores may be determined by the events discovery service 180 as described with reference to FIG. 13. The events 308, 310, 312 may be ordered in the user interface 134 based on their corresponding scores, so that the event having the highest score, which is Event A 308 with the score 0.90, is displayed as the first item in the list. The event having the next highest score, Event B 310 with the score 0.73, is displayed as the second item in the list. The event having the third highest score, Event M 312 with the score 0.14, is displayed as the third item in the list. Although the events 308, 310, 312 are shown in a category C1 302, events may alternatively be shown without an enclosing category, as shown by the upcoming events 406, 408 in FIG. 4A, for example.

In particular embodiments, scores may be determined for the category user interface elements 332 and 334, and the category user interface elements 332 and 334 may be displayed in the user interface 134 in an order based on their corresponding scores. The ordering of categories 302, 304 in the user interface may be based on factors associated with the user to whom the categories 302, 304 are being presented, and also on factors associated with the categories 302, 304 or with the events in the categories. Determination of scores for event categories is described with reference to FIG. 14. As an example, the category interface element having the highest score in FIG. 3 is the element 332 with score 0.95, so the element 332 is displayed as the first category (e.g., in the left-most column, top-most row in the area for displaying categories of the interface 134). The category interface element having the second highest score is element 334 with score 0.80, so the element 334 is displayed as the second category (e.g., in the second position from the left, in the top-most row). Other directions are possible, e.g., in order of descending score from right-to-left for a right-to-left language, or in order of descending score from bottom-to-top in an interface that presents the highest-scoring element at the bottom of the list.

The event categories 302, 304 may include one or more categories 302 of events that are located within a threshold distance of a location of the user 190. The categories 302 of events that are located within a threshold distance may include a category of upcoming events that are scheduled to occur within a threshold period of time after the category of upcoming events is presented to the user, e.g., upcoming events.

The social-networking system 160 may receive the one or more event categories 302, 304 and the one or more events 308, 310, 312 in each event category from a social-networking system server 162. The social-networking system 160 may receive the category content 332 for each event category 302 from a social-networking system server 162. The social-networking system 160 may receive selection of one of the event category interface elements 332, 334 and present to the user 190 a list of one or more events 308, 310, 312 in an event category 302 that corresponds to a selected event category user interface element 332. The events 308, 310, 312 in the event category 302 may be presented in order of relevance to the user 190, wherein the relevance of each event is based on a corresponding event score received from the social-networking system server 162.

FIGS. 4A-4B illustrate example events discovery user interfaces 402. A control element 403, which may select filter criteria for restricting the displayed events, displays the state "Upcoming" to indicate that upcoming events are being displayed in the user interface 402. The control element 403 may be selected by the user to cause different items to be displayed in place of the upcoming events. Other choices for the filter criteria that may be selected via the selection element 403 include "Invites" to display invitations to events, "Saved" to display events the user has saved, "Hosting" to view events the user is hosting, and "Past" to view events that occurred in the past. A "Create" button 405 may be selected by the user to cause an event creation interface to be displayed, which the user may interact with to create a new event.

In particular embodiments, the events discovery user interface 402 may present event categories 412, 414 and events 406, 408 to enable a user 190 to view, register for, modify, and otherwise manage the online representations of the real-world events. The event categories and events may be selected based on their relevance to the particular user 190, e.g., identified in the context of the particular user 190. The recommended events may be selected by the events discovery service 180 and communicated to the events discovery user interface 402.

FIG. 4A illustrates example upcoming events 404, categories of nearby events 410 occurring on particular dates, and popular events 416 that are popular with friends, in an events discovery user interface 402. FIG. 4B illustrates example suggested events 422 and categories of events 430. As can be seen in FIGS. 4A and 4B, the events discovery user interface 402 may be divided into multiple sections 404, 410, 416, 422, 430. In particular embodiments, a list 404 of one or more upcoming events 406, 408 that are scheduled to occur at a future time (e.g., after the events are presented) may be presented to the user 190. The list of events 406, 408 may include between one and a threshold upper limit number of events that the user is registered to attend. A list of popular events 416 may include events 415 that are popular with one or more friends of the user 190. A suggested list of events 422 may include events that are suggested for the user 190. An event image 424, event details 426, and a reason for a recommendation of the one or more events (not shown) may be displayed in association with each of the events in the suggested list of events 422. As an example, the reason for the recommendation for an event 406 related to jazz music may be that the event was recommended because the user likes jazz events.

The social-networking system 160 may present one or more user interface sections 404, 410, 416, 422, 430 in a scrollable region of an events discovery interface 402. Each section may display one or more selectable interface elements 412, 414, 432, 440, e.g., icons or text, associated with one or more upcoming events or event categories. The sections may include a first section displaying the list of one or more events 406, 408 and a second section displaying the event category interface elements 432, 434. The events discovery interface 402 may scroll vertically, so there is not necessarily a separation between the portions of the interface shown in FIG. 4A and the portions shown in FIG. 4B.

In particular embodiments, the events discovery user interface 402 may present one or more event UI elements 406, 408 that represent particular events, such as upcoming events near the user's location and for which the user has registered or indicated an interest, events that are popular with the user's friends, events that are suggested for the user, and the like. The upcoming events may be displayed in an Upcoming Events section 404. When an event element 406 is selected by a user, the UI may respond by requesting details about the event associated with the event element from the events discovery service 180. The events discovery user interface 402 may receive the details of the selected event from the service 180 and present the details in the user interface 402.

In particular embodiments, events 406, 408 may be presented in the user interface 402 in an order based on the user's interests, e.g., so that events of greater interest to the user are presented in the list ahead of events of less interest to the user. Alternatively, the events 406, 408 may be presented in order based on the dates of the events, in order based on distance from the user's location, in an order based on the number of the user's friends that are registered for the events, in alphabetical order, or in an order based on a combination of one or more of those criteria.

In particular embodiments, the events discovery user interface 402 may present one or more event category user interface elements 432, 440 in a categories section 430. Each of the category UI elements may represent a category of events, such as a "Music" category 432, a "Food" category 434, a "Today" category 412, and so on. The event category elements may be represented in the UI as images, text, videos, or other types of displayed media objects that depict or describe the corresponding events and categories. The event category UI elements may be a predetermined list of elements including, e.g., "Today" 412, "This Weekend" 414 in the nearby events section 410 and "Music" 432, "Nightlife" 434, "Food and Drinks" 436, "Sports—Fitness" 438, Fine Arts—Crafts 440, Film—Photography 442, Performing Arts 444, Community 446, Causes, 448, Other 450, and others not shown, as illustrated in the categories section 430. One or more of the event category UI elements may be selected for display in the user interface 402 based on attributes of the user, such as the user's interests. For example, if a user is interested in sports and food, but not music and nightlife, then the "Sports and Fitness" 438 and "Food and Drinks" 436 category elements may be displayed. As another example, the categories may be presented in an order based on the user's interests. For example, if the user has a strong interest in food, a medium level of interest in sports, and no interest in nightlife or music, then the "Food and Drinks" 436 category element may be the first element in the displayed list of categories, and the "Sports—Fitness" 438 category element may be the second element in the displayed list of categories. In particular embodiments, when a category UI element is selected by the user, the events discovery user interface 134 may present one or more event UI elements that represent events in the selected category as shown in FIGS. 5A and 5B.

In particular embodiments, in the events discovery user interface 402, each event category element 412, 414 may include content customized based on the particular user's interests and, optionally, on one or more of the events in the corresponding category. For example, an event category UI element 432 may include an image of the highest-ranked event in the category. The image displayed for the element 432 is based on the image of the highest-ranking event in the Music category. The image of the highest-ranking event in the Music category is shown in the event 508 of the user interface 502 in FIG. 5A. The particular categories to be presented may be selected based on the user's interests and other social network information associated with the user or with the user's friends. Categories that contain events of interest to the user's friends may also be presented. The user may select one of the event category UI elements, in which case the events in the corresponding category may be presented in the UI. The events may be presented in a ranked order according to factors associated with the user or with the user's friends, such as interests, user profiles, and past interactions with the social-networking system.

For example, an image that represents the Music category may be displayed on the screen of a user's mobile device in the events discovery user interface. The displayed image, or the area of the screen in which the image is displayed, may be responsive to selection by touch input or other type of input. A list of events in the Music category may be displayed in ranked order when the Music category image is selected. The displayed image may be generated by, for example, identifying the highest-ranking event for the user in the Music category, scaling or cropping the image, e.g., to a size appropriate for the screen of the mobile device, and superimposing the name of the category ("Music") on the image. As an example, if the highest-ranking event for the user in the music category is "Tokyo Police Club" on June 13, then the image for the Music category may be generated based on the image associated with the Tokyo Police Club event. As another example, the displayed image may be based on a combination of high-ranking events, such as a combination of the images associated with the top three events in the ranking. The user may select the image to view the events in the category associated with the image.

In particular embodiments, an Upcoming Events section 402 is displayed at the top of the events discovery user interface 402. A Nearby Events section 410 shows events near the user's location, a Popular with Friends section 416 shows events friends are going to, a Suggested for You section 422 shows relevant events friends are not going to, and a Categories section 430 shows several event categories that are relevant to the user. The user may select one of the categories to display a list of events in that category. Each event may be associated with three tiers of classification: a category, a format, and one or more tags. Additional sections in the user interface may include a Format section (not shown) that recommends events having a format that is relevant to or selected by the user, and a Tag section (not shown) that recommends events having a tag that is relevant to or selected by the user. Alternatively, the events having the relevant or selected format or tag may be displayed in the user interface 402, e.g., in the upcoming events section 404. The upcoming events list in the section 404 may be truncated at a certain time period, e.g., 1 month, to provide space for the other sections.

In particular embodiments, when an event UI element 406 is displayed, additional information such as event details and a reason for the recommendation may be included. The event details may be used to categorize events into categories such as music, sports, and so on. As introduced above, an event may also be categorized based on the format of the event, and based on a tag associated with the event. A user may tag an event with terms such as jazz or wine. The tag may be associated with the event in the events discovery user interface 402 or in another user interface, or automatically (e.g., without user input). For example, a food event that also includes wine may be in the food category and have wine as a tag. The reason for the recommendation may be text such as "Recommended because you are a member of the Stanford group, and the Stanford group organized this event."

In particular embodiments, the Nearby Events section 410 displays two icons: the first icon is labeled "Today" 412 and, when selected, causes events scheduled for the current day to be displayed. The second icon is labeled "This Week" 414 and, when selected, causes events scheduled for the current week to be displayed. The events may be displayed in a list that is ordered according to distance from the user's location and ranking scores, e.g., as shown in FIG. 5A. The Popular with Friends section 416 may display events that the user's friends are going to, in a list ordered according to how closely the user knows the friends who are going to the events and/or by relevance to the user. In particular embodiments, in each of the sections of the events discovery user interface 402, each of the events may be displayed in an event user interface element 415, which may include an event image 413.

In particular embodiments, a context row 418 may be displayed at a location under the event image 413 in the event user interface element 415. The context row 418 may display personalized information, such as "You're going" as well as names of friends of the user who are going to the event, e.g., "David is going" 417, and details about the event, such as the event name, date, and location. An "Interested" 419 button element may appear below the context row 418. The user may select the "Interested" button to indicate interest in the event represented by the user interface element 416. A "Share" 421 button element may also appear below the control row 418. The user may select the "Share" button 421 to share the event on the social-networking system, e.g., with other users, or with people who are not members of the social-networking system, e.g., via electronic mail. A "See All" button element 420 may be selected by the user to cause additional events that are popular with friends to be displayed, e.g., below the event interface element 415. The Suggested for You section 422 may display events that the user's friends are not going to, ordered according to relevance to the user. The suggested events may be further filtered, e.g., so that suggested events within the context of the Music category are displayed in the interface 402.

In particular embodiments the Categories section 430 may display a small number of categories that are highly-ranked or most-highly-ranked according to a user-specific ranking, e.g., four categories 432, 434, 436, 438, as images or other media objects that may include renderings of the category names or other information associated with the categories. Several additional categories of lower rank may be displayed less prominently in a list of additional category names 440-450 below the icons. There may be any number of categories of events, e.g., 10, 15, 20, or the like. The categories 440-450 that are displayed may be filtered, e.g., by displaying categories that have events at a particular location or on a particular date.

In particular embodiments, when a user selects one of the icons, e.g., Music, the events in that category are shown in a list ranked according to relevance to the user as shown in FIG. 5A. The events in the category may optionally be ranked according to a combination of relevance to the user and how closely the user knows friends who are going to the events. Thus, the first event shown is the top-ranking event that was used to select the category content for the category, so that visual continuity may be provided between the category content and the list of events in the selected category.

In particular embodiments, lists of events such as those shown in FIGS. 5A and 5B may be presented in a news-feed-type interface. Thus, events may be browsed as a feed that may be dynamically filterable. For example, the Nearby Events interface 502 may display the list of nearby events using a news-feed-type interface. The header at the top of the feed interface may include a location drop down that displays a current location, e.g., Palo Alto, Calif. and may be selected to change the current location. The current location may be used to filter the feed by neighborhood, city, or other type of location. A date range selector 506 may be displayed at the top of the list of events, e.g., All, Today, Tomorrow, This Weekend, and so on. The feed may be a relevance-ordered feed of events that match the top query. For example, in the Music category feed shown in the interface 502, if the user is in San Francisco, the top query shows the events in the next couple of months ordered by what the query processor thinks is most appropriate for the user. A filter user interface element may be provided to enable the user to define a filter having a specific category, format, and tag. The user can also filter by distance, e.g., to restrict the displayed events to events located within a given radius of the user's location.

FIG. 5A illustrates example events in a music category in an events discovery user interface 502. The interface 502 includes a header 504 displays the word "Music" and "Near Palo Alto, Calif." to indicate that events in the Music category that are located near Palo Alto, Calif. are displayed. A date filter 506 includes selectable filter options, including "All", "Today", "Tomorrow", and "This Weekend" to cause filters for the respective date ranges to be applied to the query that identifies the events that are displayed. A first displayed event, "Luke Bryan—Kill The Lights Tour", includes an event image 507 that shows an image associated with the event, and a context area 508 that shows the date, time, and location of the event, as well as the number of people interested in the event. A second displayed event, "Zac Brown Band Live at Shoreline", includes an event image 510 and a context area 512. A third displayed event, "Tech N9e's", includes an event image 432 and a context area 514. FIG. 5B illustrates example events in a nightlife category in an events discovery user interface that includes two displayed events, "CHOCOLATE ART SHOW" with an image and a context area 518, an "Choose—We Play!", which includes an image 520 and a context area 522.

A selectable date range user interface element 506 may be presented to the user and may include one or more selectable date ranges. The selectable date ranges may include ranges that correspond to today, tomorrow, this week, this weekend, next week (e.g., relative to the date and time at which the date range is being selected), or a user-specified date. Selection of a date range, e.g., by the user 190, may cause the list of events displayed in the user interface 502 to be restricted to events associated with dates that are in the selected date range, e.g., events scheduled to occur on the current day if the "Today" range is selected.

Figure 6A:
FIG. 6A illustrates example event category user interface elements.
Figure 6B:
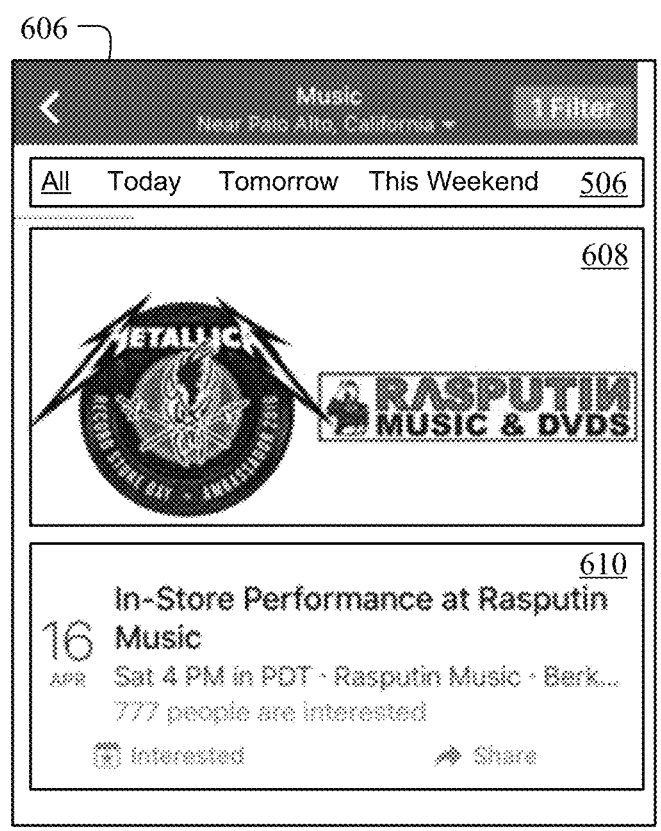
FIG. 6B illustrates an example event image.

FIG. 6A illustrates example event category user interface elements, and FIG. 6B illustrates an example event image. An example Music category user interface element 604 has category content that includes an image based on an image associated with an element 608 from the same (Music) category is shown in FIGS. 6A and 6B. The image 608 of the category from FIG. 6B has been combined with the category name "Music" and reduced in size for display as the category user interface element 604, which has an appearance similar to an icon.

Figure 7A:
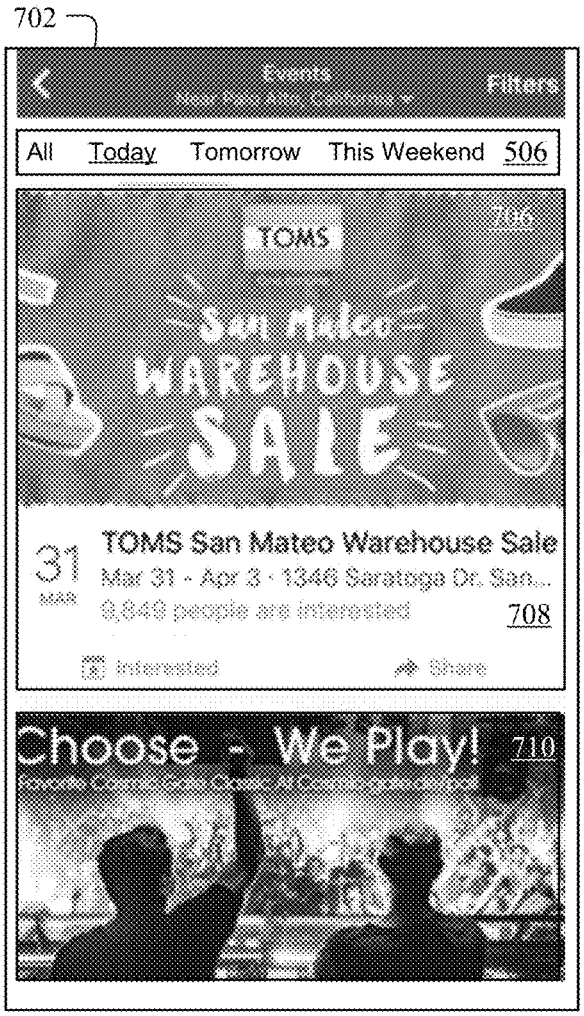
FIGS. 7A-7C illustrate example events and categories in an events discovery user interface.
Figure 7B:
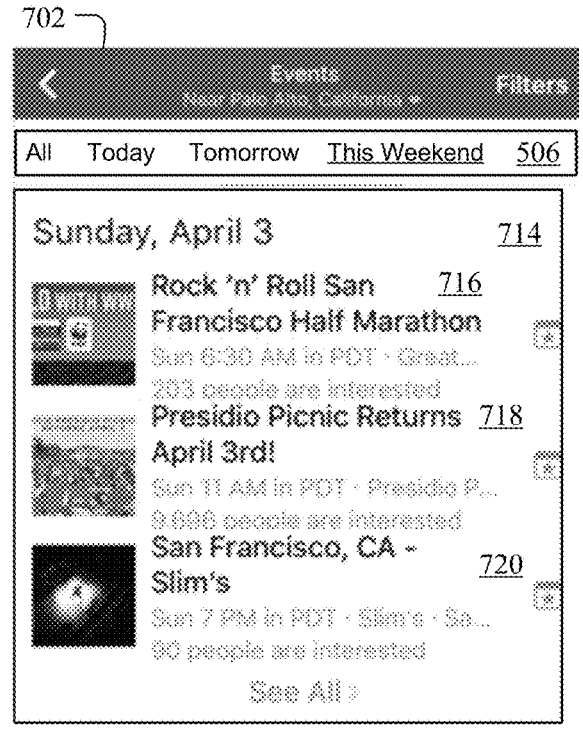
Figure 7C:
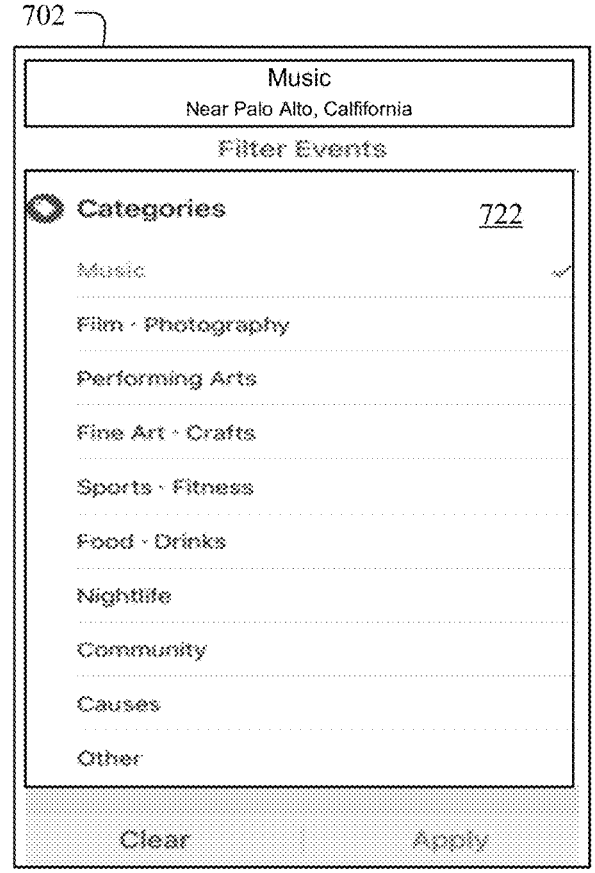

FIG. 7A illustrates example events in a Today category in an events discovery user interface. FIG. 7A shows a list of events 706, 710 occurring "today", e.g., on the day that the list is presented in a user interface 702. FIG. 7B shows a list of events occurring "this weekend" (e.g., relative to when the list is presented). FIG. 7C shows a list of categories 722, which may be displayed by selecting a "Filters" interface component of the user interface 702. The list of categories 722 indicates that the Music category is selected, which may be a result of the user selecting the Music category interface element 604. Optionally, the list of categories 722 may be responsive to user selection of one or more categories, in which case the list of events shown in the user interface 702 may be updated to include events in each of the selected categories.

Figure 8:
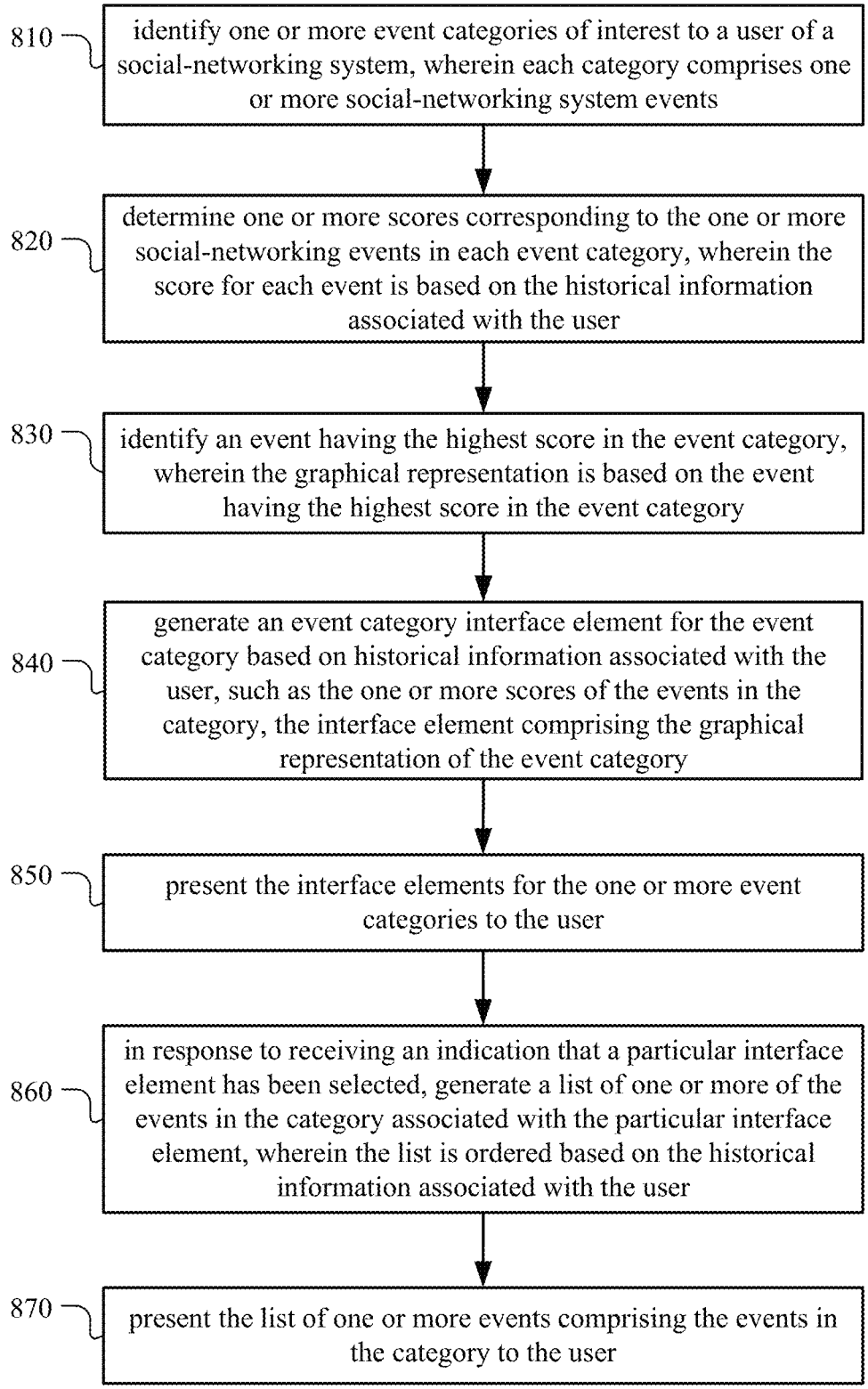
FIG. 8 illustrates an example method for presenting event categories and events in an events discovery user interface.

FIG. 8 illustrates an example method 800 for presenting event categories and events in an events discovery user interface. The method may begin at step 810, where the social-networking system 160 may identify one or more event categories of interest to a user of a social-networking system, wherein each category comprises one or more social-networking system events. At step 820, the social-networking system 160 may determine one or more scores corresponding to the one or more social-networking events in each event category, wherein the score for each event is based on the historical information associated with the user. At step 830, the social-networking system 160 may identify an event having the highest score in the event category, wherein the graphical representation is based on the event having the highest score in the event category. At step 840, the social-networking system 160 may generate an event category interface element for the event category based on historical information associated with the user, such as the one or more scores of the events in the category, the interface element comprising the graphical representation of the event category. At step 850, the social-networking system 160 may present the interface elements for the one or more event categories to the user. At step 860, the social-networking system 160 may, in response to receiving an indication that a particular interface element has been selected, generate a list of one or more of the events in the category associated with the particular interface element, wherein the list is ordered based on the historical information associated with the user. At step 870, the social-networking system 160 may present the list of one or more events comprising the events in the category to the user.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for presenting event categories and events in an events discovery user interface including the particular steps of the method of FIG. 8, this disclosure contemplates any suitable method for presenting event categories and events in an events discovery user interface including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, one or more social-networking system events to be evaluated for recommendation to a target user 190 may be selected from a set of events 182 stored in a data store 164 or other event storage system. To identify events to be recommended to the target user 190, a social-networking system 160 may identify one or more social network events that satisfy a query condition. The query condition may be evaluated by a query processor of the data store 164 or other event storage system, and the query processor may identify one or more events that satisfy the query condition. That is, the query condition may identify particular events when evaluated by the query processor. For example, the query condition may identify events that friends of the target user 190 have registered to attend. Events to which friends of the user have registered to attend, e.g., to which the friends are going, may be events for which the second user is a friend of the target user, and the second user is registered to attend the event. In another example, the query condition may identify events for which the second user is registered to attend, but is not a friend of the user.

In particular embodiments, the query condition may identify social-networking system events that correspond to real-world events having real-world locations within a threshold distance of the target user 190's geographical location. The query condition may identify events associated with a selected event category, venue, location, or on a specified date. The particular query conditions that are used may be specified by the target user or by an administrator, or may be pre-determined. The identified social network events may be ordered by degree of separation between a second user and the target user.

In particular embodiments, the social-networking system 160 may receive an event category identifier, and the events that satisfy the query condition may include events associated with the received event category identifier, e.g., events in the identified category. The social-networking system 160 may receive a location or date, where the one or more social network events that satisfy the query condition include one or more events associated with the received location or date.

In particular embodiments, the social-networking system 160 may determine an event score for each of the events identified by the query. The event score for each event may be based on one or more event signals 184 that are each related to a first interaction between the target user and the social-networking system 160. The first interaction may associate the target user with the identified event. The first interaction may have occurred within a threshold duration of time prior to determining the event score, so that old interactions may have no effect on the score, or may have less effect on the score than newer interactions. The signals used to determine event scores may be related to the user's likes of entities, e.g., venues, artists, categories of music, tags, and other types of relations between entities and users. The score may be determined, for example, as a weighted average of the signal values, or may be determined by a machine-learning algorithm based on the signal values. One of the signals may be based on how many times the event has been (a) liked or (b) hidden by one or more friends of the target user. One of the signals may be based on whether an organizer of the event is a friend of the target user.

In particular embodiments, the first interaction may include an interaction that associates the target user with the identified event, e.g., an interaction that associates the target user with an entity that is in turn associated with the event. The signals may be related to an interaction between the target user and the social-networking system in which the target user indicates that he or she likes particular venues, artists, categories of music, tags. The signals may be related to other types of relations between entities and users. A signal value may be related to, for example, an interaction in which the target user indicates he or she is close friends with another user who is going to the event, an interaction in which the target user indicates he or she likes the event's venue, an interaction in which the target user indicates that he or she is a member of a group that organized the event, an interaction in which the target user indicates he or she has attended a previous event associated with the entity, e.g., a previous event at the venue, an interaction in which the target user indicates that he or she likes a category associated with the event or a similar category, or other interaction between the user and the social-networking system. One or more of the identified events may be presented to the target user in an order based on the event score of each identified event. The social-networking system 160 may exclude one or more of the identified events from presentation to the target user based on a filtering condition. For example, the five highest-scoring events may be displayed in an events discovery user interface. The social-networking system 160 may present one or more of the identified events to the target user in an order based on the event score of each identified event. Alternatively, the event scores may be used in other ways, e.g., to determine a score for an event category that contains the events, or to determine the most relevant event in a category.

In particular embodiments, the target user may correspond to a user node 202 in a social graph 200 of the social-networking system, the entity associated with the event may correspond to a concept node 204 in the social graph 200, and the association between the target user and the entity may include a connection between the user node and the concept node. The target user may correspond to a first user node in a social graph 200 of the social-networking system, the entity associated with the event may correspond to a second user node in the social graph 200, and the association between the target user and the entity may include a connection between the first user node and the second user node.

In particular embodiments, events that the user's friends are not going to may be of interest to the user, but the user may be less likely to discover such events because the user's friends may not inform the user about the events they are not going to. Events the user's friends are not going to may be identified using a query. The query that identifies events may be further parameterized, e.g., to select events in the context of the Music category. The events identified by the query may then be ordered according to relevance to the user.

In particular embodiments, the social-networking system 160 may identify one or more event categories from a set of event categories, where each event category is associated with a category name and comprises one or more categorized events. The social-networking system 160 may present the event categories to the target user. There may be a more than one category of events, e.g., 10 or more categories. Based on the user's recent interactions, e.g., in the past week, two weeks, or month, a dynamic ranking algorithm may be is used to identify categories that are relevant to the user. The events in a category can be identified using a query that identifies events regardless of whether friends are going. The query that identifies events can be further parameterized to include a location or date.

To identify the one or more event categories, the social-networking system 160 may determine a category score for each of the identified event categories. The category score may be based on one or more signals, each signal may be related to a second interaction between the target user and the social-networking system, and the second interaction may associate the target user with an event in the identified event category. The social-networking system 160 may present one or more of the identified event categories to the target user in an order based on the category score of each event category. The social-networking system 160 may further present one or more images corresponding to the event categories, and each of the one or more images may include a name of the corresponding event category.

In particular embodiments, the social-networking system 160 may receive selection of one of the event categories, where the plurality of events may be identified by the selected category. The social-networking system 160 may present one or more of the categorized events in the selected event category to the target user, wherein the categorized events are presented in an order based on the event score of each identified event.

In particular embodiments, the scores determined for events may be used to rank events based on how appropriate the events are for recommendation to the user. As introduced above, the score for an event may be based on one or more signal values, which may be based on one or more signals that are related to the user's likes of entities, e.g., venues, artists, categories of music, tags, and other types of relations between entities and users. A signal value may range from a strong value corresponding to, e.g., a person the user is close friends with who is going to the event, to a weak value corresponding to an event that is popular but not necessarily linked to the particular user. Other signals may produce scores in the range between the strong and weak values based on context. These signals may include, for example, (1) an indication that the user likes the event's venue, (2) an indication that the user is a member of a group that organized the event, or (3) an indication that the user has previously seen events at the venue. Event metadata may be associated with events, e.g., a category tag that indicates the event is a jazz event. The metadata may be used to recommend the event. In particular embodiments, the signals on which the event score is based may be selected from a predetermined set of signals by calculating a value for each of the signals in the predetermined set of signals and selecting between one and a predetermined number of the signals having the greatest calculated values in the predetermined set of signals as the signals on which the event score is based.

In particular embodiments, the ranking algorithm may be part of a recommendation system that may pre-process data offline to construct a machine learning model, and may generate an event ranking for the user based on the events. As new events are identified or received, the recommendation system may update its machine learning model based on the new events. When queried, e.g., by location, date range, and so on, the recommendation system may return the ranking of events, but does not necessarily return the reasons for the rankings of the individual events. A reason for an existing recommendation may be determined based on the recommendation and on information in the social graph 200. The determination may be performed by the events discovery service (e.g., on the one or more servers 162), or by the events discovery user interface 134 (e.g., on the client system 130). The reason for the recommendation may be identified by traversing the users and then determining how the users are connected to the event. For example, suppose that a user has liked the page, is interested in this artist, and they like jazz. Thus, to show the reason for the recommendation, the social-networking system 160 may determine which one of those three is the appropriate one to show based on ratings of each received from the front end. Over time, the strongest signal point (or multiple strongest signal points) may be identified and sent to the user interface. As a result, a reason for recommendation may be presented in the user interface along with the event. The reason may be, e.g., "recommended because you like jazz events that are family friendly."

In particular embodiments, the social-networking system 160 may determine a reason for recommendation of an event 415 by identifying, in a social graph 200 of the social-networking system 160, one or more paths between a first node 202 that corresponds to the target user and a second node that corresponds to the event 204. Each of the one or more paths includes one or more links 206. If a path contains multiple links 206, then the links 206 are connected to one or intermediate nodes 202 or 204. The social-networking system 160 may determine a strength of connection associated with each of the paths based on one or more link types associated with the one or more links 206. For example, the existence of a link 206 in the social graph 200 of type "likes" may be used to determine that the reason for recommendation is the user liking an entity related to the event. If a node 204 is related to the event, e.g., by being connected to the event node 204, and is connected to the user's node 202 by a "likes" link 206, then the reason for recommendation may be that the user likes the entity represented by the node 204 related to the event. The reason may further include the name of the node to which the link 206 is connected. For example, if the user's node 202 is connected to a venue node 204 that represents a venue "Concord Pavilion" related to the event (e.g., because the venue node 204 is connected to the event's node 204), then the reason for recommendation may be "Event recommended because you like the Concord Pavilion, which is the event's venue."

As another example of determining a reason for a recommendation, a link 206 of type "friends" may be used to determine that the reason for recommendation is the user being friends with another user who corresponds to a node 202 connected to the link 206 by the "friends" link. For example, if the node 204 is connected to a user node 202 that represents the user "Andrew", and Andrew has attended another event at the venue related to the event, then the reason for recommendation may be "Event recommended because you are friends with Andrew, and Andrew has attended an event at the Concord Pavilion." To determine whether to use a particular path as a reason for recommendation, the strength of connection (e.g., distance or a weighted distance) between the target user node 202 and the node 204 related to the event (or to the node 204 that represents the event, since the node related to the event is ordinarily connected to the event node 204) may be determined and compared to a threshold value or to strength values for other paths between the two nodes.

The social-networking system 160 may identify a path having the greatest strength of connection, e.g., the shortest path, from the target user's node 202 to the node 202 or 204 related to the event (or to the event node 204 itself, which may be connected to the node 204 related to the event). For example, in the first example above, the node 202 that represents the target user is connected to the node 204 that represents the venue, so the distance between the two nodes is one link. In the second example, the node 202 is connected to the node 202 that represents the friend user, which is connected to the node 204 that represents the venue, so the distance between the target user's node and the node related to the event is 2 links. Thus, the reason in this example is based on the friends link because it is associated with the shortest of the evaluated paths. If one reason is to be presented, then the strongest reason, e.g., the one based on the friends link, may be selected for presentation to the target user 190. Thus, the social-networking system 160 may generate the reason for recommendation based on one or more links 206 and one or more nodes 202 or 204 of the identified path having the greatest strength of connection. The reason for recommendation may be based on an action performed by the target user 190, e.g., linking a place or friending a user, and on an entity associated with the action, e.g., the place or user. The action may be identified by the one of the one or more links 206, and the entity may be identified by the one or more nodes 202, 204.

Although the strength of connection is based on the distance between nodes in this example, the strength may be based on other factors in other examples, e.g., on a weighted path length in which each link is multiplied by a weight associated with the type of the link. If the path strength is inversely proportional to the path length, then smaller weights may correspond to stronger paths and vice-versa. For example, if a target user 190 prefers recommendations based on his or her friends over recommendations based on her or her likes, then a "likes" link may have a weight of 3, and a "friends" link may have a weight of 1, so that the "likes" links may have higher weight (and lower strength) than "friends" links, because each "likes" link is multiplied by 3, and each "friends" link is multiplied by 1 to determine the weighted length. In this example, the path having the smallest weighted length is the strongest path. Since the weighted length of the "likes" path is 1 link multiplied by a weight of 3, and the weighted length of the "friends" path is 2 links multiplied by a weight of 1, the "likes" path has the greater strength and may be the path used to determine the reason for the recommendation.

In particular embodiments, events may be classified using up to three classification attributes associated with each event. The classification attributes may be an event category, an event format, and an event tag. These attributes may correspond to three tiers, with the category, format, and tag being the first, second, and third tiers, respectively. The categories may be category names music, sports, and so on. The categories may be assigned by a user who creates or modifies the event, may be determined automatically based on details associated with the event. The tag attribute allows a user to tag an event with terms such as jazz, wine, or any other terms. For example, a food event that also includes wine may be in the "food" category and have "wine" as a tag. A festival may be a collection of events.

In particular embodiments, a user 190 may select a tag user interface element 409 to cause a tag 423 to be associated with an event 415. When the user 190 selects the tag user interface element 415, a tag 423 may be received from the user 190 and associated with corresponding event 415. The tag 423 associated with the event may subsequently be presented to a user 190 when the event 415 is displayed. Names of one or more friends of a user who are going to an event may be displayed with the event (e.g., in the event list). When the social-networking system 160 receives selection of one of the events in the user interface, the social-networking system 160 may present details of the selected event to the user. In particular embodiments, a tag may be displayed as a text user interface element 423 next to the number of people going to the event. Tags may be superimposed on event images (similarly to how category names may be superimposed on category images). The context row 418 may highlight tags or topics of items that the user has tagged, e.g., the fact that the user liked Jazz, or was interested in or attended Jazz events.

In particular embodiments, multiple different signals may be available, and a subset (e.g., one or two) of the available signals may be selected for use in the ranking process. For example, if a user attends events tagged with judo, then the user likes judo events. The user may also attend events tagged with related tags, such as martial arts and sports. As this example shows, the level of abstraction of different tags may range from general to specific. In this example, sports is more general than martial arts, and martial arts is more general than judo. The tagging system has a mapping of coefficients that indicate how different tags relate to each other. Using these relations, event context may be identified at the level of abstraction that is most appropriate to the user's behavior. For example, judo relates to karate with a particular coefficient, but both judo and karate relate to martial arts with a much stronger coefficient. If martial arts has a stronger signal than judo because the user goes to many martial arts events, then the martial arts tag is most appropriate for the user based on their behavior.

As another example, looking at how the word jazz maps to different things, jazz has Miles Davis as a coefficient, and has more nuanced things such as bebop, as well as funk and soul as a much broader coefficient. Those sub-categories may be categorized by a composite tag jazz-funk-soul, which is more specific than the Music category. A user's interests may be gauged from a vague and general level to a discrete and specific level, and the level of context most appropriate for the user may be identified based on the gauged level. In particular embodiments, the level of context most appropriate for the user may be found by identifying the strongest of the signals that are generated for the user. That is, the signals to be used for identifying relevant events (e.g., for calculating scores for events) for a particular user may be identified as a subset of the set of signals generated for the user, where the subset contains the greatest signal values, e.g., the 10 highest generated signal values. Examples of such signals generated for a user may be based on the user liking a genre of the event, the user's friend being registered to go to an event, or the user being in a group associated with or attending the event. For example, a signal based on actions or characteristics of a friend may be further based on a friend coefficient for the friend. As another example, for a page like action, there may be a strength of association between the user and the page, and the strength of the association may be used in determining whether to use the page like action as a signal for scoring and ranking events for the user.

FIGS. 9A-9F illustrate examples of connections between users and events that may be identified in the social graph 200 and used to determine scores for events for use in for ranking and filtering the events. As an example, a score for a target user's interaction with an event may be determined based on an interaction that corresponds to the target user liking the entity associated with the event, e.g., by performing an action that adds a "likes" edge between the target user and the entity associated with the event in the social graph 200. As another example, the target user's interaction may correspond to an indication that the target user has attended a previous event associated with the entity. The entity associated with the event may be a venue, a performing artist, an organizer of the event, or a friend of the target user who has attended another event at the venue, attended another event associated with the performing artist, or attended another event associated with the organizer. As another example, the target user's interaction may correspond to an indication that there is a friend relation between the target user and one or more other users associated with the event. As another example, the target user's interaction may correspond to an indication that the target user is a member of a group associated with the event, such as a group that organized the event. Although determinations of scores based on particular interactions are disclosed, scores may be determined based on other interactions. FIGS. 9A-9F illustrate examples in which nodes and edges in a social graph 200 may represent interactions and may be used to determine scores for events.

Figure 9A:
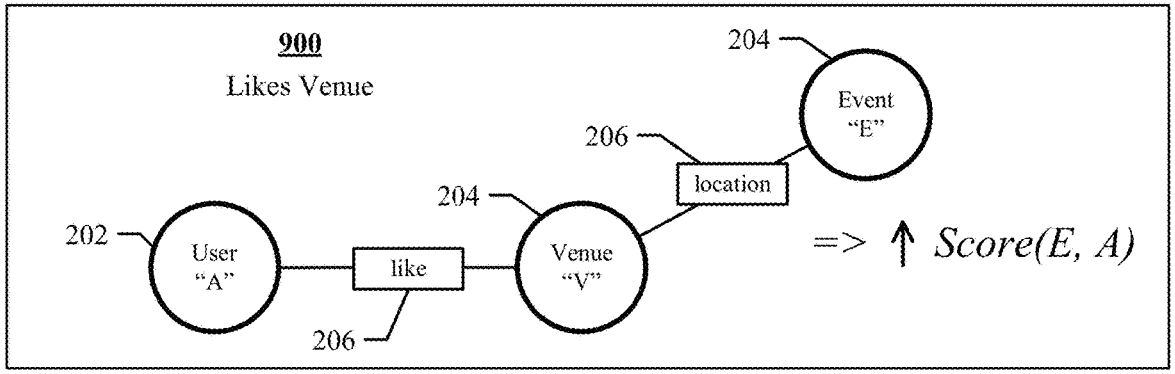
FIGS. 9A-9F illustrate examples of connections between users and events that may be identified in social graphs and used to determine scores for events for use in for ranking and filtering the events.

FIG. 9A illustrates an example in which a ranking signal for an event is based on an indication in a social graph 200 that the user likes a venue at which the event is located. This signal may be referred to as a "likes venue" signal. If the graph shown in FIG. 9A, or a similar graph (e.g., another graph having nodes of different types that have the same meanings as the illustrated nodes), is identified, e.g., as a sub-graph, in a social graph 200, then the score for the event E being determined for the user A may be increased. The amount by which the score may be increased may be a constant value, e.g., 1, or may vary, e.g., based on a weight associated with the "likes venue" signal. The graph for the "likes venue" signal includes a user node "A" that corresponds to the user for whom the score is being determined, and a venue node "V" that corresponds to the venue associated with the event "E". The venue may be a name of a place or building at which the event is to occur, and may also be referred to as a location of the event. In this graph, the user node "A" may be associated with the venue node "V" by a "like" link 206, and the venue node "V" may be associated with the event node "E" by a "location" link. Presence of this graph or a similar graph in a social graph 200 indicates that the score for the event "E" for the user "A" may be increased, e.g., by a value such as 1. Although the "likes venue" signal generates a score depending on whether a user likes a venue, other signals may generate scores based on whether a user likes other types of entities. As an example and not by way of limitation, a "likes artist" signal may generate a score with a value such as 1 when the user node is connected to an artist node, such as a node that represents the artist "Luke Bryan" or the artist "Zac Brown Band" (not shown) by a "like" link, and the artist node is connected to the event node by a link such as an "artist" or "performer" link.

Figure 9B:
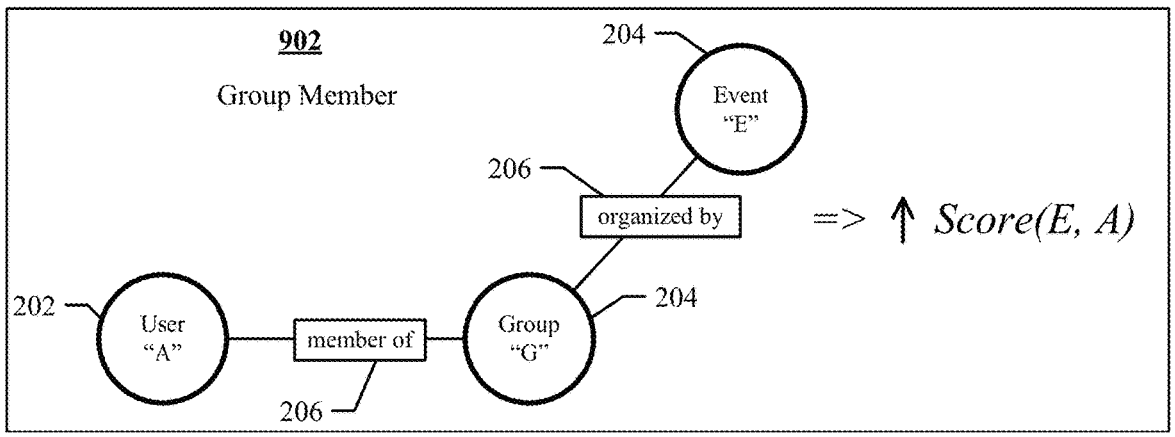

FIG. 9B illustrates an example in which a ranking signal for an event is based on an indication in a social graph 200 that the user is a member of a group that organizes the event. FIG. 9B illustrates an example in which a ranking signal for an event is based on an indication in a social graph 200 that the user is a member of a group that organized (or otherwise created, manages or is associated with) the event. This signal may be referred to as a "group member" signal. If the graph shown in FIG. 9B, or a similar graph, is identified in a social graph 200, then the score for the event E being determined for the user A may be increased. The amount by which the score may be increased may be a constant value, e.g., 1, or may vary, e.g., based on a weight associated with the "group member" signal. The graph for the "group member" signal includes a user node "A" that corresponds to the user for whom the score is being determined, and a group node "G" that corresponds to the group that organized the event "E". The group may be a social-networking system group that includes one or more social-networking system users, or other group of users who organized, created, or manages the event. In this graph, the user node "A" may be associated with the group node "G" by a "member of" link 206, and the group node "G" may be associated with the event node "E" by an "organized by" link or other type of link indicating that the group organized, created, manages, or is otherwise associated with the event. Presence of this graph or a similar graph in a social graph 200 indicates that the score for the event "E" for the user "A" may be increased, e.g., by a value such as 1.

Figure 9C:
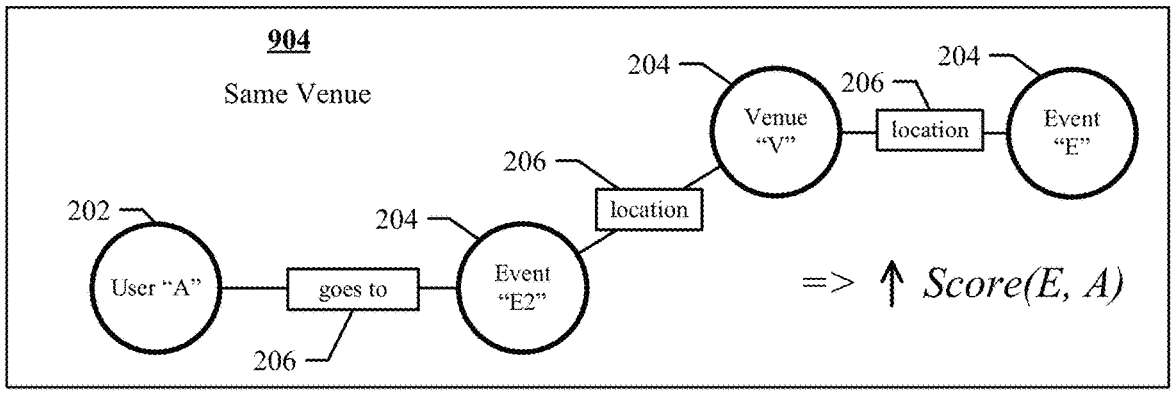

FIG. 9C illustrates an example in which a ranking signal for an event is based on an indication in a social graph 200 that the user goes to another event located at the same venue. FIG. 9C illustrates an example in which a ranking signal for an event is based on an indication in a social graph 200 that the user has gone to (or is going to or will go to) another event "E2" that is located or held at the same venue "V" as the event "E". This signal may be referred to as a "same venue" signal. If the graph shown in FIG. 9C, or a similar graph, is identified in a social graph 200, then the score for the event E being determined for the user A may be increased. The amount by which the score may be increased may be a constant value, e.g., 1, or may vary, e.g., based on a weight associated with the "same venue" signal. The graph for the "same venue" signal includes a user node "A" that corresponds to the user for whom the score is being determined, an event node "E2" that corresponds to an event different from the event "E" for which the score is being determined, and a venue node "V" that corresponds to a venue associated with both the event "E" and the event "E2". In this graph, the user node "A" may be associated with the event node "E2" by a "goes to" link 206 that indicates one or more of past, present or future attendance at the event by the user "A", the event node "E" may be associated with the venue node "V" by a "location" link 206, and the node "V" may be associated with the event node "E" by another "location" link 206. Presence of this graph or a similar graph in a social graph 200 indicates that the score for the event "E" for the user "A" may be increased, e.g., by a value such as 1.

Figure 9D:
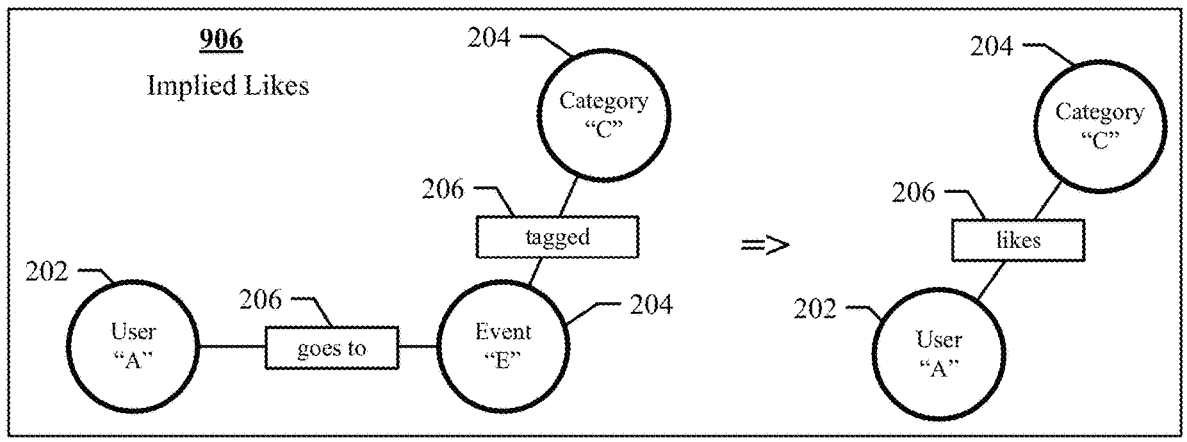

FIG. 9D illustrates an example in which a user going to an event tagged with an entity category or sub-category implies that the user likes the category or sub-category. FIG. 9D illustrates an example in which an indication in a social graph 200 that the user "A" goes to (or has gone to or will go to) an event that is tagged with a category "C" implies that the user "A" likes the category "C". That is, a "like" link 206 may be established between the user node "A" and the category "C" node (or other representation of the likes relation may be created). This graph arrangement does not necessarily directly change the score of an event, but may still be referred to as an "implied likes" signal. Once the "like" link between the category "C" and the user "A" has been established, another signal described below (referred to as the "likes same category" signal) may cause a score increase for an event "E" that is tagged with the category "C" liked by the user "A". The graph for the "implied likes" signal includes a user node "A" that corresponds to the user for whom the score is being determined, an event node "E" that corresponds to an event to which the user "A" is linked by a "goes to" link 206, and a category node "C" to which the event node "E" is linked by a "tagged" link 206. Presence of this graph or a similar graph in a social graph 200 indicates that the user "A" likes the category "C", and a "like" link may consequently be established between the user node "A" and the category node "C". Although the node "C" is referred to as a category node in this example, the node "C" may be any type of node with which an event node may be tagged. Furthermore, although the link to the node "C" is referred to as a "like" link, other types of links that represent relations between nodes may be substituted, such as a "speaks" link to a spoken language node "C" (which may be but need not be a category node) or a "makes" link to a node "C" that represents a thing.

Figure 9E:
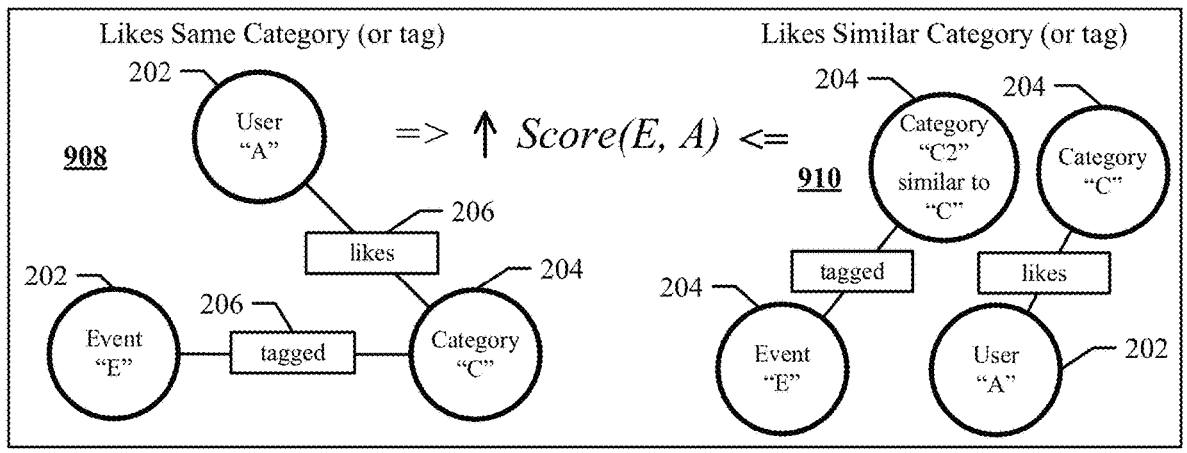

FIG. 9E illustrates an example in which a ranking signal for an event is based on an indication in a social-graph that a user likes a category or sub-category with which the event is tagged. One of the signals may be based on a category or sub-category of the event. A match between classification metadata associated with the event and one or more interests of the user may contribute positively to the event's score. In particular embodiments, a match between a category or sub-category of the event and a category or sub-category liked by the user may contribute positively to the event's score. One of the signals may be based on a category or sub-category liked by the target user. One of the signals may be based on whether a category or sub-category of the event matches a category or sub-category of another event liked by the target user. For example, a match between a type of music associated with the event and a type of music liked by a user, e.g., jazz music, may contribute positively to the event's score.

In the example of FIG. 9E, a ranking signal for an event "E" is based on an indication in a social graph 200 that the user likes a category "C" with which the event "E" is tagged. This signal may be referred to as a "likes same category" signal. If the graph 908 shown in FIG. 9E, or a similar graph, is identified in a social graph 200, then the score for the event E being determined for the user A may be increased. The amount by which the score may be increased may be a constant value, e.g., 1, or may vary, e.g., based on a weight associated with the "likes same category" signal. The graph 908 for the "likes same category" signal includes a user node "A" that corresponds to the user for whom the score is being determined, and a category node "C" that corresponds to a category liked by the user. In this graph, the user node "A" may be associated with the category node "C" by a "like" link 206 that indicates user "A" likes the category "C", and the category node "C" may be associated with the event node "E" by a "tagged" link 206 that indicates node "E" has been tagged with the tag "C". Presence of the graph 908 or a similar graph in a social graph 200 indicates that the score for the event "E" for the user "A" may be increased, e.g., by a value such as 1.

In particular embodiments, the score for an event may be increased if the event is tagged with a category that is similar to a category the user likes. Since the category is similar to but not the same as the category the user likes, the score for the event may be increased by a value that is smaller than the value used when the category is an exact match to a category the user likes. The value by which the score is increased may be determined based on a degree of similarity between the similar category and the exact category. The degree of similarity may be determined using a table of similarity coefficients or other type of similarity function, such as a function trained using machine learning techniques. An example coefficient table for music categories is shown in FIG. 12. The coefficient table provides a values for pairs of category tags, e.g., a function Similarity(C1, C2) is the similarity coefficient for categories C1 and C2, which is the value at row C1, column C2 of the table. If there is no similarity between C1 and C2, e.g., because C1 and C2 are different types of things, such as a type of music and a type of cuisine, then the similarity coefficient may be 0.

This signal may be referred to as a "likes similar category" signal. If the two graphs 910 shown in FIG. 9E, or similar graphs, are identified in a social graph 200, then the score for the event E being determined for the user A may be increased by a value based on the similarity between the category liked by the user and the similar category. The amount by which the score may be increased may also vary based on other factors, e.g., based on a weight associated with the "likes similar category" signal. The two graphs 910 for the "likes similar category" include a first graph having a user node "A" that corresponds to the user for whom the score is being determined and a category node "C" that corresponds to a category liked by the user. In this graph, the user node "A" may be associated with the category node "C" by a "like" link 206 that indicates user "A" likes the category "C". A second one of the graphs 910 is a second graph in which a second category node "C2" that represents a category similar to the category of node "C" may be associated with the event node "E" by a "tagged" link 206 that indicates node "E" has been tagged with the tag "C2". Presence of this graph or a similar graph in a social graph 200 indicates that the score for the event "E" for the user "A" may be increased by a value less than the value is increased when the user likes the same category that the event is tagged with. The value by which the score is increased may be based on the similarity between the same category C and the similar category C2, e.g., Similarity(C, C2) from a table of similarity coefficients. Although the node "C" is referred to as a category node in this example, the node "C" may be any type of node with which an event node may be tagged. Furthermore, although the link to the node "C" is referred to as a "like" link, other types of links that indicate affinity between nodes may be substituted.

Figure 9F:
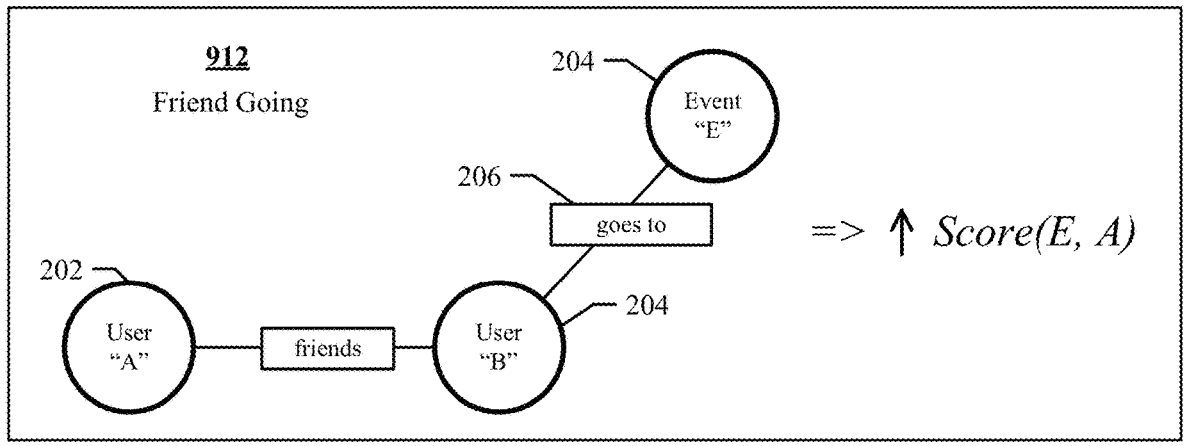

FIG. 9F illustrates an example in which a ranking signal for an event is based on an indication in a social graph 200 that the user is friends with another user who goes to the event. FIG. 9F illustrates an example in which a ranking signal for an event is based on an indication in a social graph 200 that the user is friends with another user who goes to the event. This signal may be referred to as a "friend going" signal. If the graph 912 shown in FIG. 9F, or a similar graph, is identified in a social graph 200, then the score for the event E being determined for the user A may be increased. The amount by which the score may be increased may be a constant value, e.g., 1, or may vary, e.g., based on a weight associated with the "friend going" signal. In particular embodiments, the "friend going" signal may be given a greater weight than the signals described above, particularly if the friend is a close friend of the user (e.g., having a degree of separation of 1 or 2). For example, the "friend going" signal may be given a weight of 2×, so that the score may be increased by the constant value 2 when the signals described above are increased by the value 1. Other weights may be used for this signal or any of the other signals described above, e.g., with higher weights being used for signals that are determined to be strong indicators of the user's interest in the event.

The graph 912 for the "friend going" signal includes a user node "A" that corresponds to the user for whom the score is being determined, and a user node "B" that corresponds to a friend of user "A". The "friend going" signal may be based on a degree of separation between the first user node and the second user node. The friend "B" may a restricted to being a friend of no greater than a threshold degree of separation from A. Alternatively, the friend "B" may have any degree of separation from "A", in which case the weight of the "friend going" signal may be inversely proportional to the degree of separation. In the graph 912, the user node "A" may be associated with the user node "B" by a "friends" link 206 (or chain of friend links separated by other users corresponding to intermediate friends), and the user node "B" may be associated with the event node "E" by a "goes to" link. The "goes to" link may indicate that the user "B" has gone to, is going to, is at, or will go to the event. Presence of the graph 912 or a similar graph in a social graph 200 indicates that the score for the event "E" for the user "A" may be increased, e.g., by a value such as 2.

Figure 10:
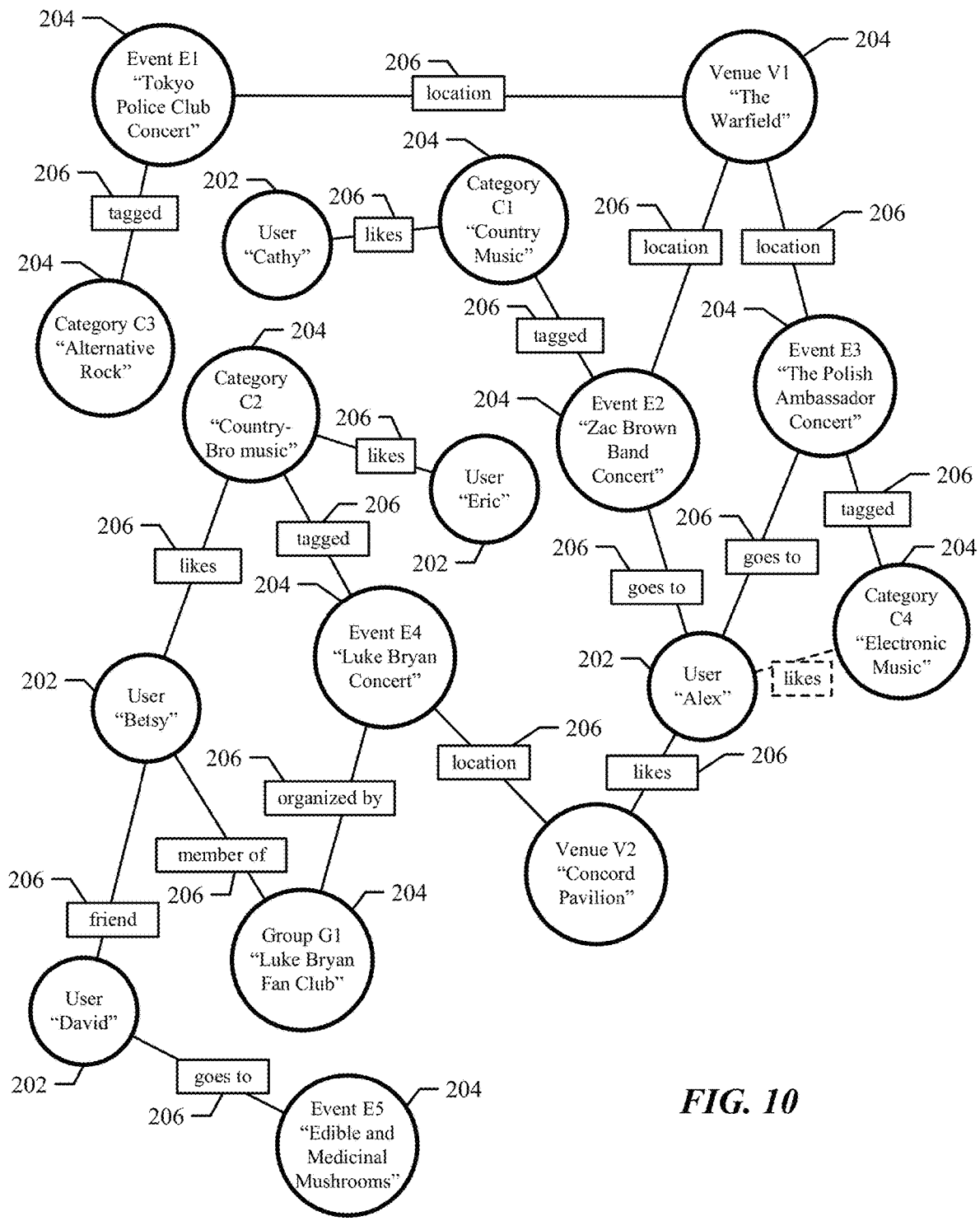
FIG. 10 illustrates an example social graph for calculating example event scores.

FIG. 10 illustrates an example social graph 1000 for calculating example event scores. The social graph 1000 includes users who are connected to event nodes, and particularly to music-related event nodes. An event node 204 "E1: Tokyo Police Club Concert" represents a music concert event referred to as E1 performed by an artist named "Tokyo Police Club." The event node "E1" is connected to a category node 204 "C3: Alternative Rock" by a "tagged" link 206 to indicate that event "E1" is tagged with category "C3". The event "E1" is also connected to a venue node "V1: The Warfield" by a "location" link 206 to indicate that the event "E1" occurs at the venue "V1". The venue node "V1" is connected to two other event nodes "E2: Zac Brown Band Concert" and "E3: The Polish Ambassador Concert" by location links. Both event nodes "E2" and "E3" are connected to a user node "Alex" 202 by "goes to" links 206 to indicate that the user "Alex" is going to those events. Further, the event node "E3" is connected to a category node "C4: Electronic Music" by a "tagged" link 206 to indicate that event "E3" is tagged with category C4. The event node "E2" is connected to a category node "C1: Country Music" by a "tagged" link 206 to indicate that the event "E2" is tagged with category "C1". The category node "C1" is connected to a user node "Cathy" 202 by a "like" link 206, which indicates that the user "Cathy" likes the category "C1".

The user node "Alex" is also connected to a venue node "V2 Concord Pavilion" by a "like" link 206 to indicate that user "Alex" likes the venue "V2". The venue "V2" node is connected to an event node "E4 Luke Bryan Concert" by a "location" link 206 to indicate that the event "E4" occurs at the venue "V2". The event node "E4" is connected to the category node "C2 Country-Bro Music" by a "tagged" link 206 to indicate that the event "E4" is tagged with category "C2". The category node "C2" is connected to a user node "Betsy" 202 by a "like" link 206 to indicate that the user "Betsy" likes the category of music "C2". The user node "Betsy" is connected to the group node "G1: Luke Bryan Fan Club" by a "member of" node to indicate that the user "Betsy" is a member of the group "G1". The group node "G1" is connected to the event node "E4: Luke Bryan Concert" by an "organized by" link 206, which indicates that the group "G1" organized the event "E4". The user node "Betsy" is also connected to a user node "David" 202 to indicate that the user "Betsy" is a first-degree friend of the user "David". The user node "David" is connected to an event node "E5: Edible and Medicinal Mushrooms" by a "goes to" node to indicate that the user "David" is going to the event "E5".

FIG. 11 illustrates example event signal data and corresponding scores based on the example social graph 1000 of FIG. 10. In particular embodiments, the event ranking method of FIG. 13 determines an event score for each event that satisfies a query condition. Given that the query condition has been satisfied for events E1-E5 shown in FIG. 10, the event scores for events E1-E5 may be determined for the four users Alex, Betsy, Cathy, and Eric shown in FIG. 10 as follows. For Alex, evaluating event E1 ("Tokyo Police Club")" for each signal, the "same venue" signal graph is present twice in the social graph 1000, since Alex goes to both E2 ("Zac Brown Band") and E3 ("The Polish Ambassador"), both E2 and E3 are connected to venue V1 ("The Warfield") by location links, and venue V1 is connected to event E1. The score for E1 is increased by 1 twice because the "same venue" graph is present on two different paths between the user node "Alex" and the event node "E1".

Evaluating E2 for the user Alex, although Alex does not directly like any categories, the "implied likes" signal graph is present because Alex goes to event E2 ("Zac Brown Band Concert"), and event E2 is tagged with the category C1 ("Country Music"). Since Alex now likes a category, the signals related to liking categories are re-evaluated for all of Alex's events (potentially E1-E5, but only E2 and E1 are re-evaluated, because E3-E5 have not been evaluated yet). As a result of re-evaluating the signals, the "likes same category" signal graph is now found to be present in the updated social graph 1000 as a result of the implied like in which Alex's attendance at the "Zac Brown Band" event implied that he likes Country music. The score for E2 is thus incremented by 1. E1 is re-evaluated as well, and the "likes similar category" signal graph is now found to be present, again as a result of the implied like establishing that "Alex likes Country Music". Since Alex now likes a category, the "likes same category" is re-evaluated for E1, but E1 is not tagged with "Country Music", so the "likes same category" signal remains 0 for E1. The "likes similar category" signal is also re-evaluated for E1 to determine whether E1 is tagged with any categories that are similar to Country Music. Since E1 is tagged with another type of music, "Alternative Rock", the similarity between "Alternative Rock" and "Country Music" is determined. The coefficient table in FIG. 12 has a coefficient of similarity of 0.3 between these two types of music, so the score for E1 is incremented by 0.3. E2's score for Alex remains at 1.

Event E3 may be evaluated next for the user Alex. The aforementioned steps for E2 are repeated similarly for E3 because the "implied likes" signal graph is also present between Alex, E3, and the category C4 ("Electronic Music"). Alex goes to event E3 ("The Polish Ambassador Concert"), and event E3 is tagged with the category C4 ("Electronic Music"). Thus the social graph 1000 may be updated to indicate that Alex now likes category C4 as shown by the dashed "like" link between the user node Alex and the category node C4. Since Alex now likes another category, the signals related to liking categories are re-evaluated for all of Alex's events (potentially E1-E5, but only E1-E3 are re-evaluated, because E4 and E5 have not been evaluated yet). As a result of re-evaluating the signals, another instance of the "likes same category" signal graph is now found to be present in the updated social graph because Alex now likes category C4. The score for E2 is thus incremented by 1. E1 is re-evaluated as well, and the "likes similar category" signal graph is now found to be present, again as a result of the implied like establishing that "Alex likes Electronic Music". Since Alex now likes another category, the "likes same category" is re-evaluated for E1, but E1 is not tagged with "Electronic Music", so the "likes same category" signal remains 0 for E1. The "likes similar category" signal is also re-evaluated for E1 to determine whether E1 is tagged with any categories that are similar to Electronic Music. Since E1 is tagged with another type of music, "Alternative Rock", the similarity between "Alternative Rock" and "Electronic Music" is determined. The coefficient table in FIG. 12 has a coefficient of similarity of 0.5 between these two types of music, so the score for E1 is incremented by 0.5. The resulting total score for E1 for Alex is 2.8 (2+0.3+0.5). E3's score for Alex remains at 1.

Event E4 may be evaluated next for the user Alex. The "likes venue" signal graph is present in the social graph 1000 between E4 and Alex, since Alex likes the venue V2 at which the event E4 is located. As a result, the score of E4 for Alex is increased by 1. The "likes similar category" signal graph is also present between E4 and Alex, since E4 is tagged with the category C2 ("Country-Bro Music") and Alex directly likes two other kinds of music ("Country Music" and "Electronic Music"). The similarity coefficient between Country Music and Country-Bro Music is 0.8, so the score for E4 is increased by 0.8. The similarity coefficient between Electronic Music and Country Bro Music is 0.25, so the score for E4 is increased by 0.25, for a total of 1.05. The event E5 is evaluated next, but there are no signal graphs present between E5 and Alex, so the score of E5 is 0. The total scores for E1 through E5 for Alex are thus 2.8, 1, 1, 1.05, and 0, respectively, as shown in the Total column of FIG. 11. In particular embodiments, the scores may be normalized to be floating-point values from 0 to 1.0. The normalization may be performed by dividing the total scores by a maximum score value. The maximum score value may be determined by limiting the contribution of each signal to the score to a value of 5 multiplied by the signal's weight. The limiting may involve evaluating at most 5 different paths for each signal. Values other than 5 may be used, e.g., 3, 10, 25, and so on. Since there are five equally-weighted signals and one doubly-weighted signal (friend going) in this example, the maximum score is 25+10=35. Dividing each event score listed above by 35 results in normalized scores of 0.08, 0.03, 0.029, 0.03, and 0, as shown in the Score (Total/Max) column of FIG. 11. Ordering the events for the user Alex by total score produces the ranking E1, E2 and E4 (tie), E3, E5, as shown in the Rank column of FIG. 11. The events may be presented to Alex in an event list, such as the list 502 of FIG. 5A, in this order.

For the user Betsy, evaluating event E1, the "likes similar category" signal graph is present in the social graph 1000 because Betsy likes category C2 ("Country-Bro Music"). Since E1 is tagged with C3 ("Alternative Rock"), which is similar to C2 with a coefficient of 0.6 (according to FIG. 12), the score of E1 is set of 0.6. Evaluating event E2 for Betsy, the "likes similar category" signal graph is again present because E2 is tagged with category C1 ("Country Music"), which is similar to C2 with a coefficient of 0.8. The score of E2 is thus set to 0.8. Evaluating event E3 for Betsy, the "likes similar category" signal is present again because E3 is tagged with the category C4 ("Electronic Music"), which is similar to C2 with a coefficient of 0.25. The score of E3 is thus set to 0.25. Evaluating event E4 for Betsy, the "group member" signal graph is present because Betsy is a member of the group G1 ("Luke Bryan Fan Club"), which organizes the event E4 ("Luke Bryan Concert"). The score of E4 is thus incremented by 1. Continuing with E4, the signal "likes same category" is also present for E4, because Betsy likes the category C2, and E4 is tagged with C2. The score of E4 is thus incremented again by 1, resulting in a value of 2. Evaluating event E5 for Betsy, the "friend going" signal is present for E5 because Betsy is friends with the user David, who is going to E5. Since E5 has a weight of 2, the score for E5 is increased by 2 for this occurrence of the "friend going" signal, resulting in a value of 2. The total scores for Betsy are shown in the Total column of FIG. 11. Ordering the events for Betsy by total score produces the ranking E4 and E5 (tie), E2, E1, E3.

For the user Cathy, evaluating event E1, the "likes similar category" signal graph is present in the social graph 1000 because Cathy likes the category C1 ("Country Music"). Since E1 is tagged with C3 ("Alternative Rock"), which is similar to C1 with a coefficient of 0.3 (according to FIG. 12), the score of E1 is set to 0.3. Evaluating event E2, the "likes same category" signal graph is present, because Cathy likes C1 and E2 is tagged with C1. Evaluating event E3, the "likes similar category" signal graph is present, because Cathy likes C1 ("Country Music") and E3 is tagged with C4 ("Electronic Music"). Country Music is similar to Electronic Music with a coefficient of 0.2, so the score of E3 is set to 0.2. Evaluating event E4, the "likes similar category" signal is again present, because Cathy likes C1 and E4 is tagged with C2 ("Country-Bro Music"). Since Country Music is similar to Country-Bro Music with a coefficient of 0.8, the score of E4 is set to 0.8. There are no signal graphs present between E5 and Cathy, so the score of E5 is 0. The total scores for Cathy are shown in the Total column of FIG. 11. Ordering the events for Cathy by total score produces the ranking E2, E4, E1, E3, E5.

For the user Eric, the scores for E1, E2, and E3 are the same as for Betsy, because both Eric and Betsy are connected to category C2 by "like" links in the same way. Unlike Betsy, however, Eric's score for E4 is 1 because although Eric likes Country-Bro Music, he is not a member of the Luke Bryan Fan Club. Further, Eric's score for E5 is 0 because Eric is not friends with David.

FIG. 12 illustrates example similarity coefficients for example event categories. As shown in the table of FIG. 12, the similarity between Music and Music is 1, because a category is the same as itself. Similarity scores between different categories are less than 1 because there is at least some difference between different categories. Other similarity coefficients are: 0.9 between Country Music and the broader category of Music (as is the case for the other sub-categories of Music, including Country-Bro Music, Alternative Rock, and Electronic Music), 0.8 between Country-Bro Music and Country Music, 0.3 between Alternative Rock and Country Music, 0.2 between Electronic Music and Country Music, 0.6 between Alternative Rock and Country-Bro music, 0.25 between Country-Bro Music and Electronic Music, and 0.5 between Alternative Rock and Electronic Music.

Figure 13:
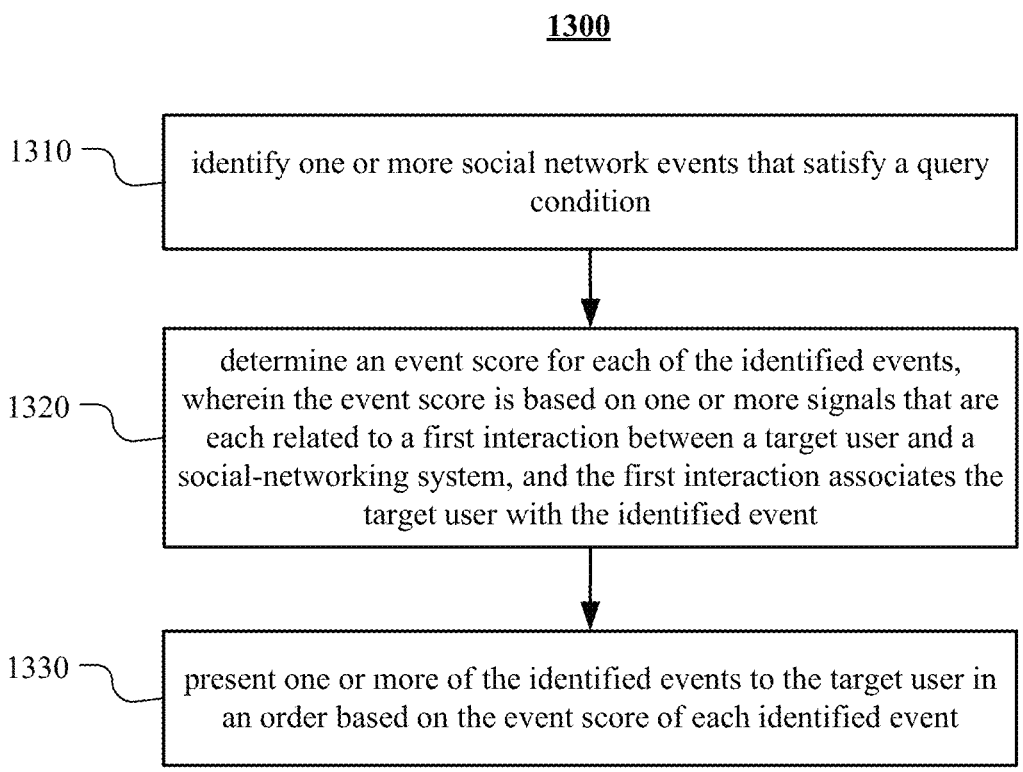
FIG. 13 illustrates an example method for ranking events.

FIG. 13 illustrates an example method 1300 for ranking events. The method may begin at step 1310, where the social-networking system 160 may identify one or more social network events that satisfy a query condition. At step 1320, the social-networking system 160 may determine an event score for each of the identified events, wherein the event score is based on one or more signals that are each related to a first interaction between a target user and a social-networking system, and the first interaction associates the target user with the identified event. At step 1330, the social-networking system 160 may present one or more of the identified events to the target user in an order based on the event score of each identified event.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for ranking events including the particular steps of the method of FIG. 13, this disclosure contemplates any suitable method for ranking events including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
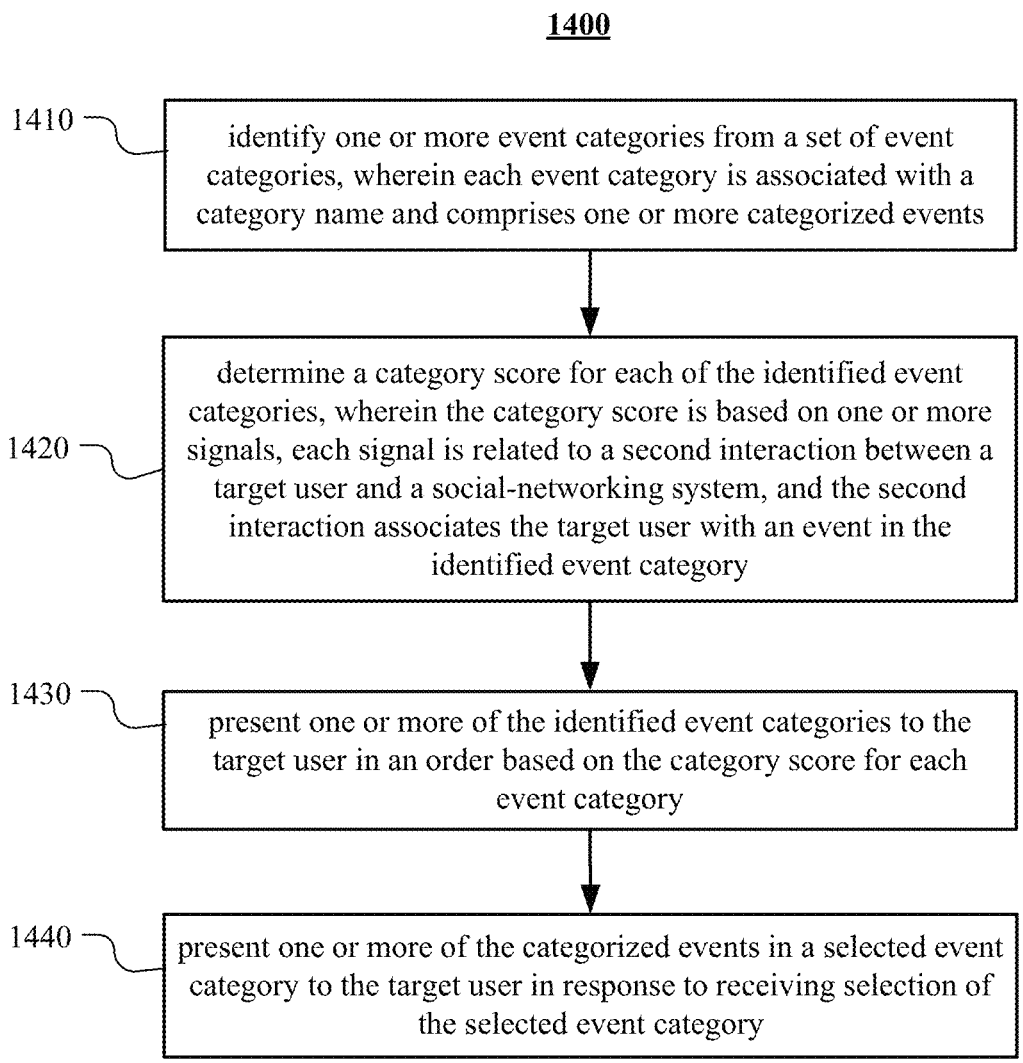
FIG. 14 illustrates an example method for ranking event categories.

FIG. 14 illustrates an example method 1400 for ranking event categories. The method may begin at step 1410, where the social-networking system 160 may identify one or more event categories from a set of event categories, wherein each event category is associated with a category name and comprises one or more categorized events. At step 1420, the social-networking system 160 may determine a category score for each of the identified event categories, wherein the category score is based on one or more signals, each signal is related to a second interaction between a target user and a social-networking system, and the second interaction associates the target user with an event in the identified event category. At step 1430, the social-networking system 160 may present one or more of the identified event categories to the target user in an order based on the category score for each event category At step 1440, the social-networking system 160 may present one or more of the categorized events in a selected event category to the target user in response to receiving selection of the selected event category.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates an example method for ranking event categories including the particular steps of the method of FIG. 14, this disclosure contemplates any suitable method for ranking event categories including any suitable steps, which may include all, some, or none of the steps of the method of FIG. 14, where appropriate. Furthermore, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Figure 15:
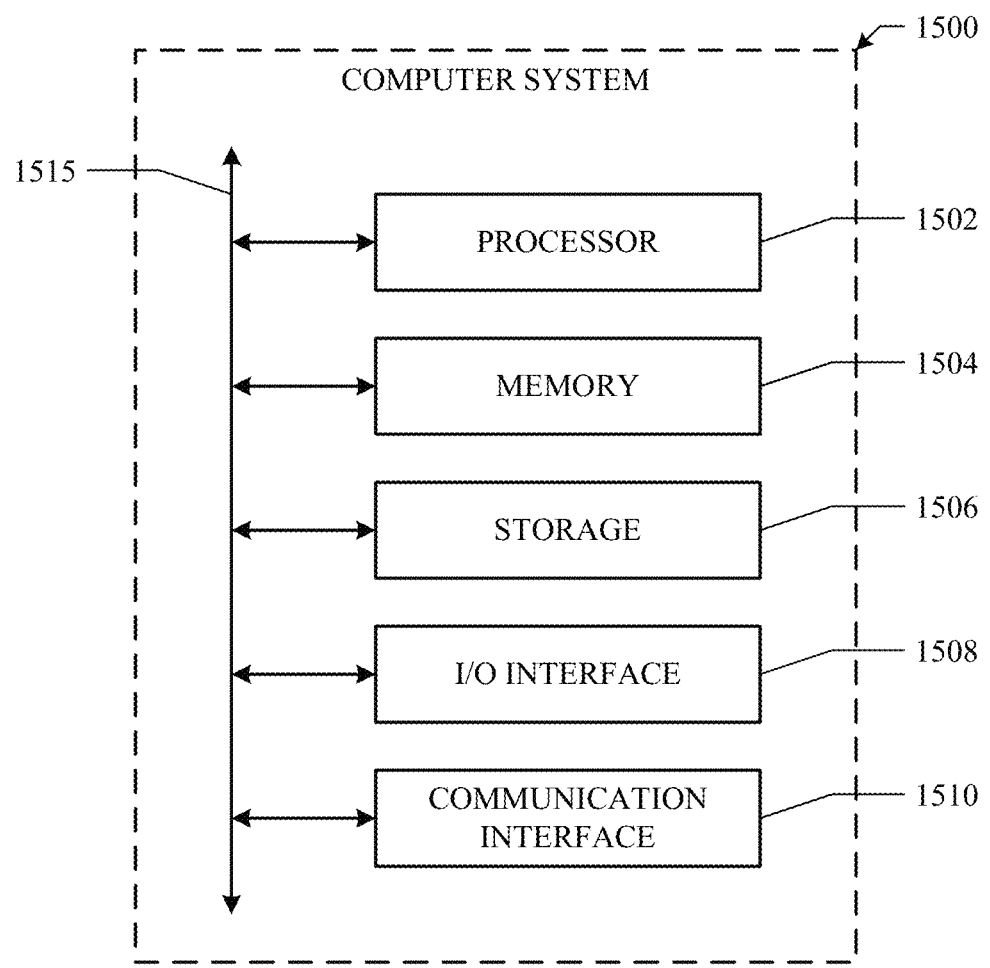
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by computing device, identifying a plurality of event categories in a social-networking system, wherein each identified event category of the plurality of event categories is associated with a category name and comprises categorized events;
   by the computing device, identifying, in a social graph of the social-networking system, sub-graphs corresponding to signals related to first interactions between a target user and the social-networking system, wherein each first interaction associates the target user with at least one of the categorized events in an identified event category,
   wherein each sub-graph comprises a user node that corresponds to the target user, an event node that corresponds to the at least one of the categorized events, and a connection between the user node and the event node, and each sub-graph has a corresponding signal value,
   by the computing device, determining a category score for each of the identified plurality of event categories, wherein the category score is based on a sum of signal values of the sub-graphs having event nodes that correspond to the categorized events in a category; and
   by the computing device, presenting the identified plurality of event categories to the target user in an order based on the category score of each identified event category.

2. The method of claim 1, wherein the first interactions include a first interaction that establishes an association between the target user and an entity associated with the at least one of the categorized events in the identified event category.

3. The method of claim 2, wherein:
   the sub-graphs include a sub-graph that corresponds to a signal related to the first interaction,
   the target user corresponds to a user node in the sub-graph, the entity associated with the at least one of the categorized events corresponds to a concept node in the sub-graph, and
   the association between the target user and the entity comprises a connection between the user node and the concept node.

4. The method of claim 2, wherein:
   the sub-graphs include a sub-graph that corresponds to a signal related to the first interaction,
   the target user corresponds to a first user node in the sub-graph,
   the entity associated with the at least one of the categorized events corresponds to a second user node in the sub-graph, and
   the association between the target user and the entity comprises a connection between the first user node and the second user node.

5. The method of claim 4, wherein one of the signals is based on a degree of separation between the first user node and the second user node.

6. The method of claim 1, further comprising:
   by the computing device, identifying social network events that satisfy a query condition in the social-networking system;
   by the computing device, determining an event score for each of the identified events, wherein the event score is based on one or more signals that are each related to a second interaction between the target user and the social-networking system, and the second interaction associates the target user with the identified events; and
   by the computing device, presenting the identified events to the target user in an order based on the event score of each of the identified events.

7. The method of claim 1, further comprising:
   by the computing device, determining an event score for each of the categorized events in the identified plurality of event categories, wherein the event score is based on one or more signals that are each related to a second interaction between the target user and the social-networking system, and the second interaction associates the target user with the categorized events; and
   by the computing device, presenting the categorized events to the target user in an order based on the event score of each of the categorized events.

8. The method of claim 7, wherein presenting the identified plurality of event categories comprises presenting one or more images corresponding to the identified plurality of event categories, each of the one or more images represents a highest-ranked event in a corresponding event category, and each of the one or more images comprises a name of the corresponding event category.

9. The method of claim 1, further comprising:
   by the computing device, identifying one or more predetermined event categories from a set of predetermined event categories, wherein each predetermined event category is associated with a category name and comprises categorized events;
   by the computing device, presenting the predetermined event categories to the target user;
   by the computing device, receiving selection of one of the predetermined event categories; and
   by the computing device, presenting the categorized events from the selected predetermined event category to the target user, wherein the categorized events from the selected predetermined event category are presented in an order based on an event score determined for each categorized event.

10. The method of claim 2, wherein the first interaction comprises a likes interaction between the target user and the entity associated with the at least one of the categorized events in the identified event category.

11. The method of claim 2, wherein the first interaction comprises an indication that the target user has attended a previous event associated with the entity associated with the at least one of the categorized events in the identified event category.

12. The method of claim 2, wherein the entity associated with the at least one of the categorized events in the identified event category comprises:
   a venue,
   a performing artist,
   an organizer of the event, or
   a friend of the target user who has attended another event at the venue, attended another event associated with the performing artist, or attended another event associated with the organizer.

13. The method of claim 1, wherein one of the signals is based on whether the target user is a member of a group associated with the at least one of the categorized events in the identified event category.

14. The method of claim 1, wherein one of the signals is based on a category or sub-category of the at least one of the categorized events in the identified event category.

15. The method of claim 1, wherein one of the signals is based on whether a category or sub-category of the at least one of the categorized events in the identified event category matches a category or sub-category of another event liked by the target user.

16. The method of claim 6, wherein the social network events that satisfy the query condition comprise events that one or more friends of the target user have registered to attend.

17. The method of claim 6, further comprising:
by the computing device, determining a reason for recommendation of an event of the social network events by:
identifying, in the social graph of the social-networking system, one or more connections between a first node that corresponds to the target user and a second node that corresponds to the event, wherein each of the one or more connections comprises one or more edges;
determining a strength of connection associated with each of the one or more connections based on one or more edge types associated with the one or more edges;
identifying a connection having the greatest strength of connection of the one or more connections; and
generating the reason for recommendation based on one or more edges and one or more nodes of the identified connection having the greatest strength of connection.

18. The method of claim 3, wherein the at least one of the categorized events corresponds to an event node in the sub-graph, and the concept node is connected to the event node.

19. One or more computer-readable non-transitory storage media embodying software that is operable when executed to:
identify a plurality of event categories in a social-networking system, wherein each identified event category of the plurality of event categories is associated with a category name and comprises categorized events;
identify, in a social graph of the social-networking system, sub-graphs corresponding to signals related to first interactions between a target user and the social-networking system, wherein each first interaction associates the target user with at least one of the categorized events in an identified event category,
wherein each sub-graph comprises a user node that corresponds to the target user, an event node that corresponds to the at least one of the categorized events, and a connection between the user node and the event node, and each sub-graph has a corresponding signal value,
determine a category score for each of the identified plurality of event categories, wherein the category score is based on a sum of signal values of the sub-graphs having event nodes that correspond to the categorized events in a category; and
present the identified plurality of event categories to the target user in an order based on the category score of each identified event category.

20. A system comprising:
one or more processors; and a memory coupled to the one or more processors comprising instructions executable by the one or more processors, the one or more processors being operable when executing the instructions to:
identify a plurality of event categories in a social-networking system, wherein each identified event category of the plurality of event categories is associated with a category name and comprises categorized events;
identify, in a social graph of the social-networking system, sub-graphs corresponding to signals related to first interactions between a target user and the social-networking system, wherein each first interaction associates the target user with at least one of the categorized events in an identified event category,
wherein each sub-graph comprises a user node that corresponds to the target user, an event node that corresponds to the at least one of the categorized events, and a connection between the user node and the event node, and each sub-graph has a corresponding signal value,
determine a category score for each of the identified plurality of event categories, wherein the category score is based on a sum of signal values of the sub-graphs having event nodes that correspond to the categorized events in a category; and
present the identified plurality of event categories to the target user in an order based on the category score of each identified event category.

* * * * *